United States Patent
Chiou et al.

(10) Patent No.: US 9,504,092 B2
(45) Date of Patent: Nov. 22, 2016

(54) SYSTEM FOR THE COEXISTENCE BETWEEN A PLURALITY OF WIRELESS COMMUNICATIONS MODULES SHARING SINGLE ANTENNA

(71) Applicant: MediaTek Inc., Hsin-Chu (TW)

(72) Inventors: Hsien-Chyi Chiou, Hsinchu (TW);
Shu-Ping Shiu, Tainan (TW);
Hong-Kai Hsu, New Taipei (TW);
Yuan-Hung Chung, Jhudong Township, Hsinchu County (TW); Wei Wang, Taichung (TW); Ren-yuh Liang, Jhubei (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 14/668,891

(22) Filed: Mar. 25, 2015

(65) Prior Publication Data
US 2015/0200692 A1    Jul. 16, 2015

Related U.S. Application Data

(63) Continuation-in-part of application No. 12/696,154, filed on Jan. 29, 2010, now Pat. No. 9,025,583.

(60) Provisional application No. 61/224,107, filed on Jul. 9, 2009.

(51) Int. Cl.
*H04L 5/00* (2006.01)
*H04W 88/06* (2009.01)
(Continued)

(52) U.S. Cl.
CPC ............ *H04W 88/06* (2013.01); *H04B 1/406* (2013.01); *H04L 5/1469* (2013.01); *H04M 2250/02* (2013.01); *H04M 2250/06* (2013.01)

(58) Field of Classification Search
CPC ...... H04B 1/0057; H04B 1/44; H04B 1/406; H04L 5/1469; H04W 88/06; H04M 2250/06; H04M 2250/02
See application file for complete search history.

(56) References Cited

U.S. PATENT DOCUMENTS 6,185,434 B1   2/2001  Hagstrom et al.
6,643,522 B1  11/2003  Young
(Continued)

FOREIGN PATENT DOCUMENTS

CN   101154951   4/2008
CN   101207420   6/2008
(Continued)

OTHER PUBLICATIONS

German language office action dated Mar. 7, 2011 and its English language translation.
(Continued)

*Primary Examiner* — Afshawn Towfighi
(74) *Attorney, Agent, or Firm* — Wolf, Greenfield & Sacks, P.C.

(57) ABSTRACT

A system for the coexistence between a plurality of wireless communication modules sharing a single antenna includes an antenna, first and second transceiving paths, and first and second wireless communications modules. The first wireless communications module is coupled to a first transceiving path and transmits or receives first wireless signals via the first transceiving path. The second wireless communications module is coupled to the second transceiving path and transmits and receives second wireless signals via the first and the second transceiving paths, wherein signal strengths of the second wireless signals passing through the second transceiving path are attenuated by a certain level, and the attenuated second wireless signals are added to the first wireless signals when passing through the first transceiving path, wherein one of the first and the second communications module is a LTE module and the other one is a WLAN module.

5 Claims, 38 Drawing Sheets

(51) Int. Cl.
H04B 1/403 (2015.01)
H04L 5/14 (2006.01)

(56) References Cited

U.S. PATENT DOCUMENTS

| | | | |
|---|---|---|---|
| 6,826,162 B2 | 11/2004 | Haines et al. | |
| 6,970,681 B2 | 11/2005 | Darabi et al. | |
| 7,446,626 B2 | 11/2008 | Gorbachov | |
| 7,496,060 B2 | 2/2009 | Ramirez et al. | |
| 7,561,852 B2 | 7/2009 | Darabi et al. | |
| 7,924,943 B2 | 4/2011 | Kim et al. | |
| 8,077,755 B2 | 12/2011 | Wu et al. | |
| 8,155,612 B1 | 4/2012 | Husted et al. | |
| 8,442,016 B1 | 5/2013 | Lee et al. | |
| 2002/0053947 A1 | 5/2002 | Macedo | |
| 2003/0198280 A1 | 10/2003 | Wang et al. | |
| 2004/0192222 A1 | 9/2004 | Vaisanen et al. | |
| 2005/0163070 A1 | 7/2005 | Farnham et al. | |
| 2006/0030265 A1 | 2/2006 | Desai et al. | |
| 2006/0194600 A1 | 8/2006 | Palin et al. | |
| 2007/0021066 A1 | 1/2007 | Dravida et al. | |
| 2007/0099567 A1 | 5/2007 | Chen et al. | |
| 2007/0224936 A1 | 9/2007 | Desai | |
| 2007/0238483 A1* | 10/2007 | Boireau | H04B 1/0057 455/553.1 |
| 2008/0123610 A1 | 5/2008 | Desai et al. | |
| 2008/0130603 A1 | 6/2008 | Wentink et al. | |
| 2008/0139118 A1 | 6/2008 | Sanguinetti | |
| 2008/0192806 A1 | 8/2008 | Wyper et al. | |
| 2008/0253345 A1 | 10/2008 | Sanguinetti | |
| 2008/0279138 A1 | 11/2008 | Gonikberg et al. | |
| 2009/0111500 A1 | 4/2009 | Sudak et al. | |
| 2009/0170447 A1 | 7/2009 | Marlett et al. | |
| 2009/0176454 A1 | 7/2009 | Chen et al. | |
| 2009/0180440 A1* | 7/2009 | Sengupta | H04W 36/14 370/331 |
| 2009/0239471 A1 | 9/2009 | Tran et al. | |
| 2009/0258607 A1 | 10/2009 | Beninghaus et al. | |
| 2010/0210299 A1 | 8/2010 | Gorbachov | |
| 2010/0260082 A1 | 10/2010 | Lum et al. | |
| 2010/0262987 A1 | 10/2010 | Imanilov | |
| 2011/0009060 A1 | 1/2011 | Hsu et al. | |
| 2011/0090887 A1* | 4/2011 | Kim | H04W 16/14 370/338 |

FOREIGN PATENT DOCUMENTS

| | | |
|---|---|---|
| CN | 101232674 | 7/2008 |
| CN | 101252757 | 8/2008 |
| CN | 101253735 | 8/2008 |
| CN | 201222725 | 4/2009 |
| DE | 112005003515 | 3/2008 |
| EP | 1 928 197 | 6/2008 |
| JP | A2006-80839 | 3/2006 |
| JP | 2008235978 | 10/2008 |
| JP | A2009-65307 | 3/2009 |
| TW | 2006 29938 | 8/2006 |
| TW | 200703939 | 1/2007 |
| WO | WO 2007/120945 | 10/2007 |
| WO | WO 20081124796 | 10/2008 |

OTHER PUBLICATIONS

English language translation of abstract of TW 2006 29938 (published Aug. 16, 2006).
English language translation of abstract of TW 200703939 (published Jan. 16, 2007, p. 3 of publication).
English language translation of abstract of DE 11 2005 003 515 (published Mar. 13, 2008).
English language translation of abstract of CN 101154951 (published Apr. 2, 2008).
English language translation of abstract of CN 101232674 (published Jul. 30, 2008).
English language translation of abstract of CN 101253735 (published Aug. 27, 2008).
English language translation of abstract of CN 101252757 (published Aug. 27, 2008).
English language translation of abstract of JP 2008235978 (published Oct. 2, 2008).
English language translation of abstract of JP A2009-65307 (published Mar. 26, 2009).
English language translation of abstract of CN 201222725 (published Apr. 15, 2009).

* cited by examiner

SYSTEM FOR THE COEXISTENCE BETWEEN A PLURALITY OF WIRELESS COMMUNICATIONS MODULES SHARING SINGLE ANTENNA

CROSS REFERENCE TO RELATED APPLICATIONS

This application is a Continuation-In-Part of U.S. application Ser. No. 12/696,154, filed on Jan. 29, 2010, now U.S. Pat. No. 9,025,583, which claims the priority of U.S. Provisional Application No. 61/224,107, filed on Jul. 9, 2009, the entireties of which are incorporated by reference herein.

BACKGROUND OF THE INVENTION

Field of the Invention

The invention relates generally to a system for the coexistence between a plurality of wireless communications modules, and more particularly, to a system for the coexistence between a plurality of wireless communications modules sharing a single antenna.

Description of the Related Art

As shown in FIG. 1, a cellular phone may connect to a wireless local area network (WLAN) via a WLAN module thereof and simultaneously communicate with a BLUETOOTH handset (or a BLUETOOTH car audio, or others) through a BLUETOOTH module thereof. WLAN is typically implemented as an extension to wired local area networks (LANs) inside a building and is able to provide the last few meters of connectivity between a wired network and mobile or fixed devices. WLAN is based on the IEEE 802.11 standard. Most WLAN may operate in the 2.4 GHz license-free frequency band and have throughput rates of up to 2 Mbps. The 802.11b standard introduces direct sequence mechanism and provides throughput rates of up to 11 Mbps. The 802.11g standard operates at a maximum raw data rate of 54 Mbps, or about 19 Mbps net throughput. As shown in FIG. 1, an access point (AP) is connected to a LAN by an Ethernet cable. The AP typically receives, buffers, and transmits data between the WLAN and the wired network infrastructure. The AP may support, on average, twenty devices and have a coverage varying from 20 meters in an area with obstacles (walls, stairways, elevators etc) and up to 100 meters in an area with clear line of sight. BLUETOOTH is an open wireless protocol for exchanging data over short distances from fixed and mobile devices, creating personal area networks (PANs). Voice over internet protocol (VoIP) data from the Internet may be received through WLAN connection and vice versa. A cellular phone may transmit voice data through an established PAN to the BLUETOOTH handset and receive speech signals captured by a microphone of the BLUETOOTH handset via the BLUETOOTH module. The cellular phone may transmit digital music through the established PAN to be played back in the BLUETOOTH handset. WLAN and BLUETOOTH both occupy a section of the 2.4 GHz Industrial, Scientific, and Medical (ISM) band, which is 83 MHz-wide. In light of cost issues as well as space used for component placement, modern electronic devices, such as cellular phones, Ultra-Mobile PCs (UMPCs) or others, are equipped with WLAN and BLUETOOTH modules sharing a single antenna instead of multiple antennas.

Referring to FIG. 2, for example, BLUETOOTH uses Frequency Hopping Spread Spectrum (FHSS) and is allowed to hop between 79 different 1 MHz-wide channels in a BLUETOOTH spectrum. WLAN uses Direct Sequence Spread Spectrum (DSSS) instead of FHSS. Its carrier remains centered on one channel, which is 22 MHz-wide. When the WLAN module and the BLUETOOTH module are operating simultaneously in the same area, as shown in FIG. 1, the single WLAN channel, which is 22 MHz-wide, occupies the same frequency space as 22 out of 79 BLUETOOTH channels which are 1 MHz-wide. When a BLUETOOTH transmission occurs on a frequency band that falls within the frequency space occupied by an ongoing WLAN transmission, a certain level of interference may occur, depending on the signal strength thereof. Due to the fact that the WLAN module and BLUETOOTH module share the same spectrum and also share a single antenna, avoiding interference therebetween is required.

FIG. 3 shows a diagram illustrating an operation conflict which may occur between a WLAN and a BLUETOOTH wireless communication service sharing a single antenna. In FIG. 3, the shared single antenna is switched between the WLAN and BLUETOOTH wireless communication services in a given time slot for transceiving data. Because the BLUETOOTH wireless communication service carries the audio data that requires real-time transmission, the BLUETOOTH wireless communication service has a higher priority over the WLAN wireless communication service. When a WLAN transceiving process takes place at the same time as a BLUETOOTH transceiving process, the WLAN transceiving process will be damaged. Referring to FIG. 3 again, the WLAN receiving operation (Rx operation) 30 occurs at a time slot when the BLUETOOTH wireless communication service remains idle. Therefore, the Rx operation 30 is performed without interference and an acknowledgement (ACK) message 31 is sent to the WLAN AP (such as the AP in FIG. 1) as a reply message after the Rx operation 30 is finished. Following the Rx operation 30, another WLAN Rx operation 32 occurs. The Rx operation 32 is also performed without interference because the BLUETOOTH wireless communication service is in the idle state. However, an ACK message 33 in response to the Rx operation 32 can not be replied to the WLAN AP, as the ACK message 33 will occupy the same time slot of a BLUETOOTH transmitting operation (Tx operation). In this case, the Rx operation 32 would be deemed as failed. In light of the failure, the WLAN AP would re-perform the Rx operation 32 with a lower rate in an attempt to successfully receive the ACK message. However, the re-performed Rx operation 32 (denoted as 34), which has a prolonged operation period, will be more likely to overlap with the BLUETOOTH transceiving time slot. This causes a further retry of the Rx operation 32, leading to a further decrement of the WLAN throughput. The performance degradation is caused by the inability of operating the WLAN and BLUETOOTH wireless communication services with a single antenna at the same time.

BRIEF SUMMARY OF THE INVENTION

In light of the previously described problems, there exists a need for a system, in which a plurality of wireless communication services may share a single antenna for simultaneous operations.

An embodiment of the invention discloses a system for the coexistence between a plurality of wireless communication modules sharing a single antenna, comprising an antenna, a first transceiving path, a second transceiving path, a first wireless communications module and a second wireless communications module. The first transceiving path is coupled to the antenna. The second transceiving path is coupled to the first transceiving path. The first wireless communications module is coupled to the first transceiving path and transmits or receives a plurality of first wireless signals via the first transceiving path. The second wireless communications module is coupled to the second transceiving path and transmits and receives a plurality of second wireless signals via the first and second transceiving paths, wherein signal strengths of the second wireless signals passing through the second transceiving path are attenuated by a certain level, and the attenuated second wireless signals are added to the first wireless signals when passing through the first transceiving path, wherein one of the first wireless communications module and the second communications module is LTE module and the other one of the first wireless communications module and the second communications module is WLAN module.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
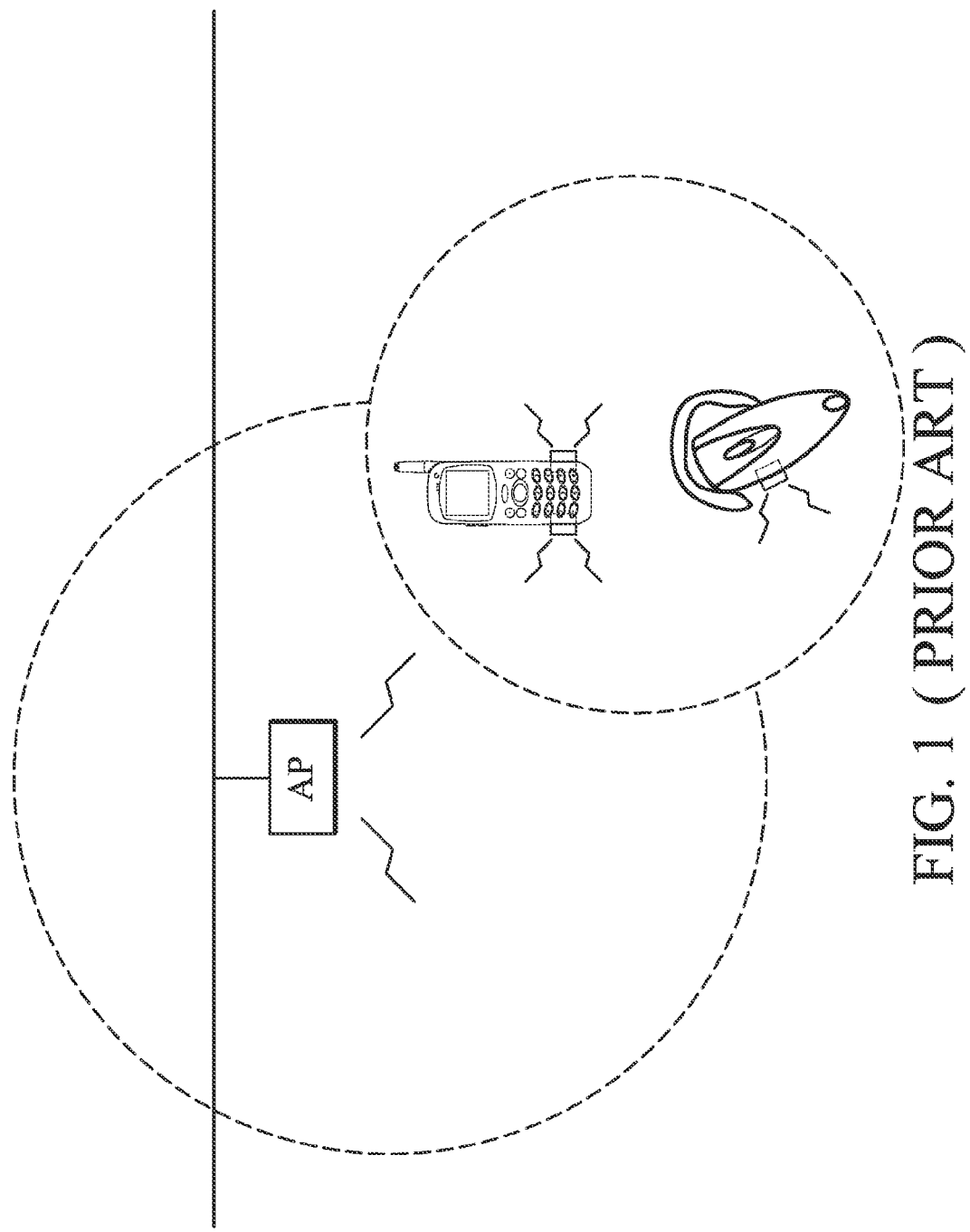
FIG. 1 shows a cellular phone associating a WLAN via a WLAN module thereof as well as communicating with a BLUETOOTH handset through a BLUETOOTH module thereof.
Figure 2:
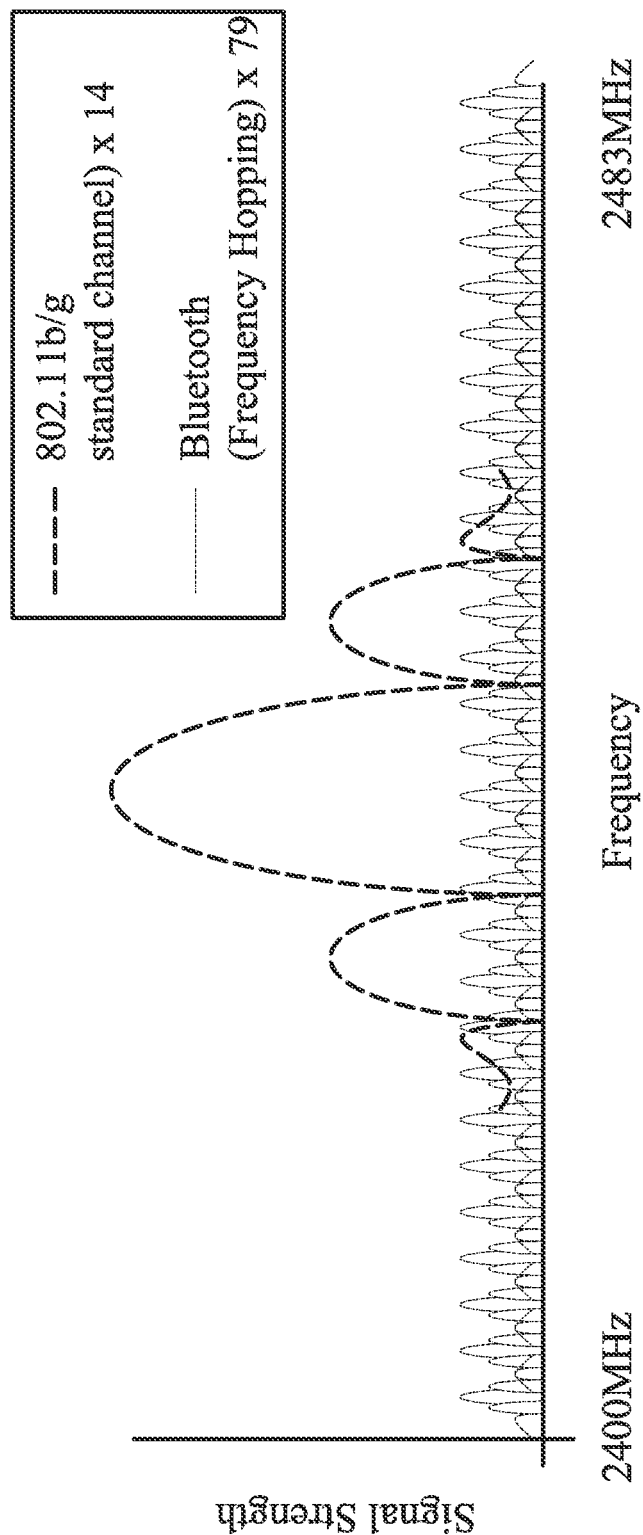
FIG. 2 shows a diagram of BLUETOOTH frequency Hopping.
Figure 3:
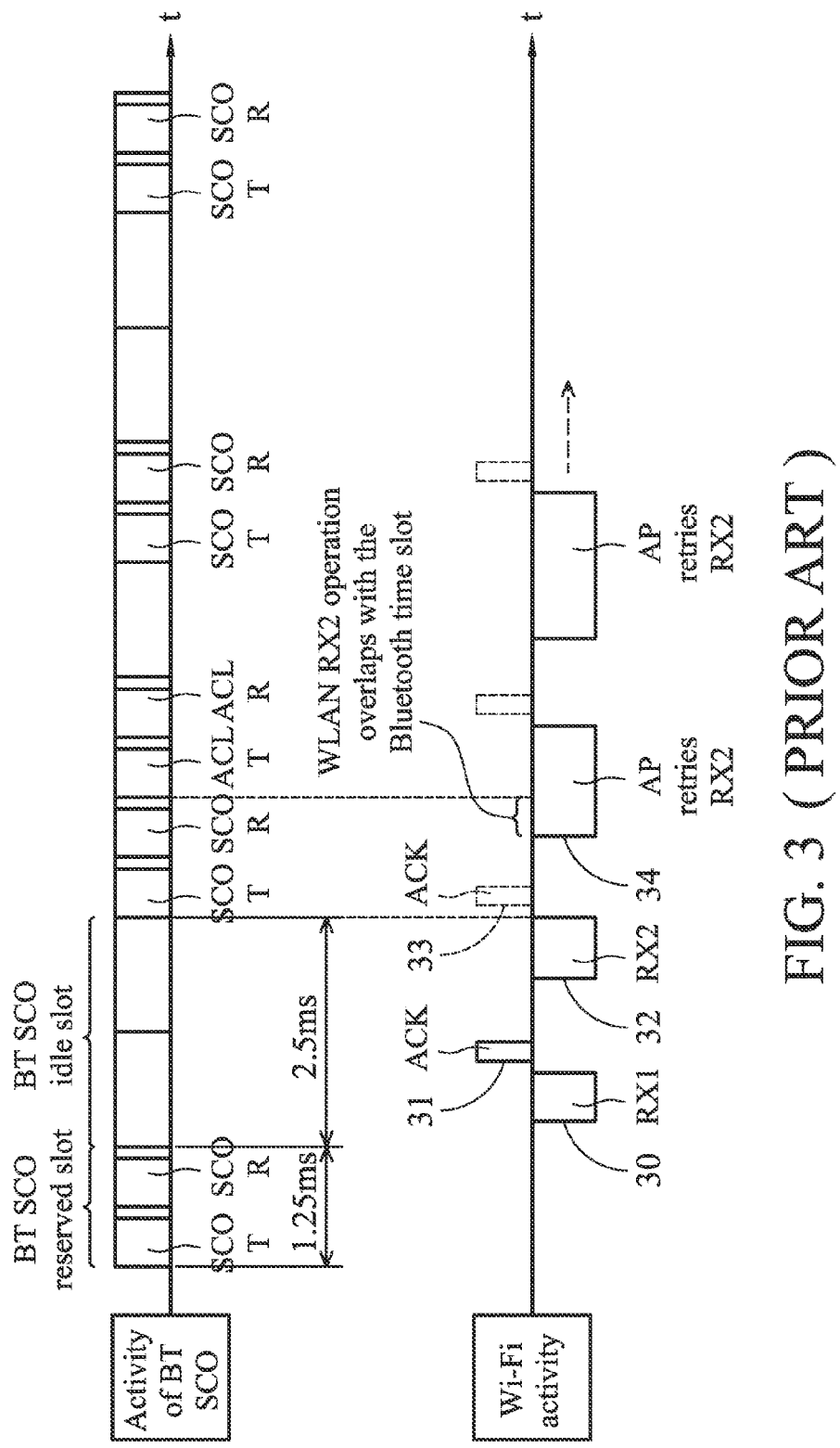
FIG. 3 shows a diagram illustrating an operation conflict between a WLAN and a BLUETOOTH wireless communication services sharing a single antenna.
Figure 4:
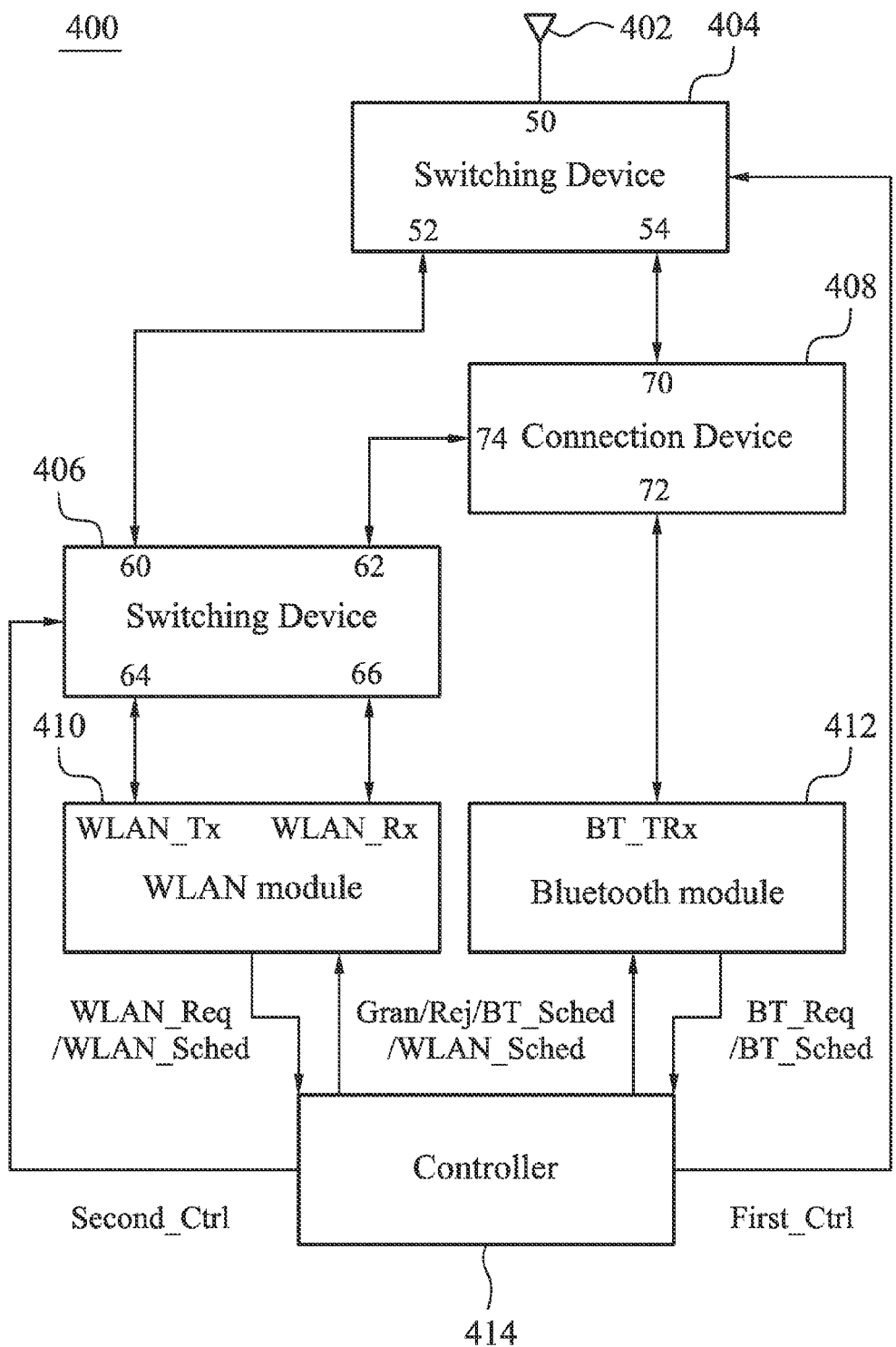
FIG. 4 shows an embodiment of a system for coexistence between a WLAN module and a BLUETOOTH module sharing a single antenna.

FIG. 4 shows an embodiment of a system for coexistence between a WLAN module and a BLUETOOTH module sharing a single antenna. The system 400 comprises an antenna 402, switching devices 404 and 406, a connection device 408, a WLAN module 410, a BLUETOOTH module 412 and a controller 414. The controller 414 may operate as a packet traffic arbitrator (PTA) controller to receive BLUETOOTH traffic requests (labeled as BT_Req) and WLAN traffic requests (labeled as WLAN_Req) and determine whether a BLUETOOTH traffic request BT_Req has collided with a WLAN traffic request WLAN_Req within a time period. If a collision occurs, the PTA controller 414 may grant both of the requests or may grant only one of the requests while rejecting the other, depending on frequency bands, priorities, operation types (e.g. Tx/Rx operation), power levels or others. The PTA controller 414 then accordingly controls the switching device 404 and 406 by control signals (labeled as First_Ctrl and Second_Ctrl) to enable one or both of the WLAN module 410 and BLUETOOTH module 412 to transmit or receive data via the shared antenna 402. The controller 414 may alternatively act as a traffic scheduler to collect BLUETOOTH schedules (labeled as BT_Sched) specifying BLUETOOTH Tx/Rx operations and WLAN schedules (labeled as WLAN_Sched) specifying WLAN Tx/Rx operations in a forthcoming time period, discover all fractional time periods having both BLUETOOTH and WLAN operations (also called collided time periods) and may cancel one of the BLUETOOTH and WLAN operations in the discovered time periods according to priorities, operation types, power levels or others. The traffic scheduler 414 then accordingly controls the switching device 404 and 406 by control signals (labeled as First_Ctrl and Second_Ctrl) to enable one or both of the WLAN module 410 and BLUETOOTH module 412 to transmit or receive data via the shared antenna 402. Collision between upcoming BLUETOOTH and WLAN operations means that the operations are fully or partially overlapped with each other in a future time period. It is to be understood that the controller 414 may be integrated into the BLUETOOTH module 412 or the WLAN module 410 to reduce hardware cost.

Figure 5A:
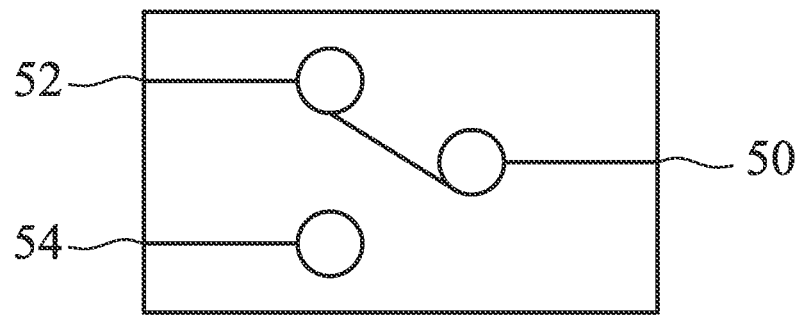
FIG. 5A shows a configuration of a switching device according to an embodiment of the invention.
Figure 5B:
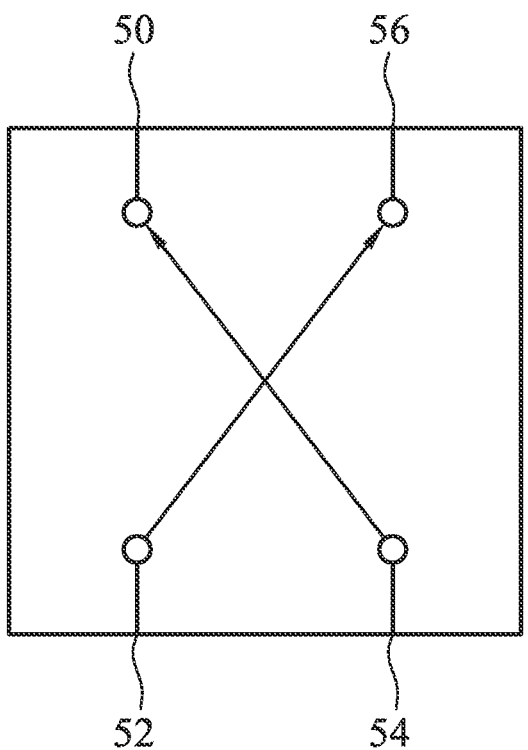
FIG. 5B shows a configuration of a switching device according to another embodiment of the invention.
Figure 6:
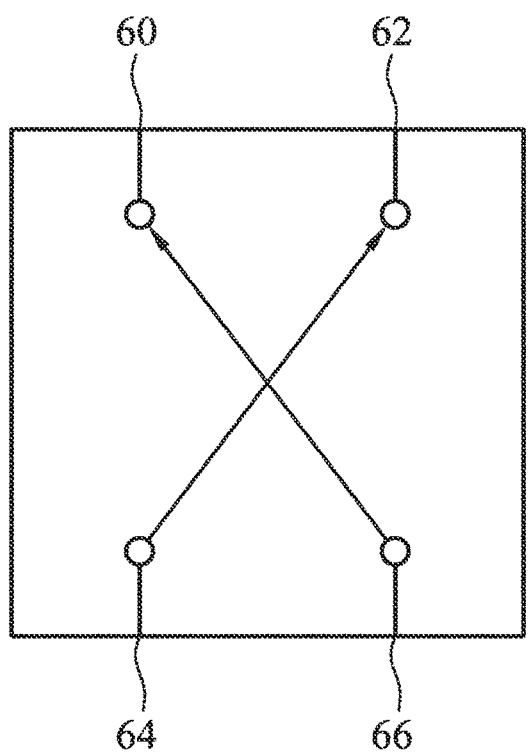
FIG. 6 yet shows a configuration of a switching device according to another embodiment of the invention.
Figure 7A:
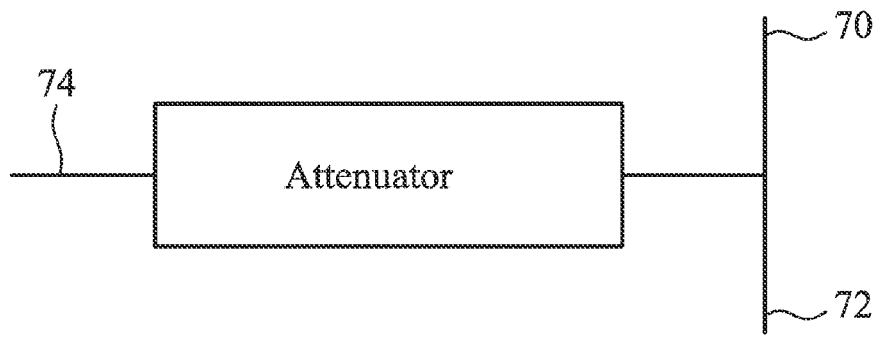
FIG. 7A shows a connection device implemented using an attenuator according to an embodiment of the invention.

The switching device 404, which consists of at least three terminals 50, 52 and 54 as shown in FIG. 5A or 5B, is configured to connect the terminal 50 to the terminal 52 or 54, as controlled by the controller 414. The switching device 406, which consists of four terminals 60, 62, 64 and 66 as shown in FIG. 6, is configured to connect the terminal 64 to the terminal 60 or 62, or connect the terminal 66 to the terminal 60 and 62, as controlled by the controller 414. The connection device 408, which consists of three terminals 70, 72 and 74 as shown in FIG. 7A, is configured to connect the terminals 70 and 72 to form a transceiving path (through path), and connect the terminals 70 and 74 to form another transceiving path (coupled path), wherein the terminal 72 is isolated from the terminal 74 by substantially 20 dB, in which electrical signals passing through the path between terminals 70 and 72 are substantially attenuated by 6 or 10 dB. The switching devices 404 and 406, connection device 408, WLAN module 410, BLUETOOTH module 412 and controller 414 may be disposed on a printed circuit board (PCB). As shown in FIG. 5A, the switching device 404 may be implemented by a single-pole double-thrown (SPDT). Referring to FIG. 5B, the switching device 404 may be alternatively implemented by a double-pole double-thrown (DPDT) switch with a terminal 56 coupled to or connected to an external node for impedance matching. The external node may be another antenna or a resistor (for example, a 50Ω resistor). In addition, the switching device 406 may be implemented by a DPDT switch as shown in FIG. 6.

Figure 7B:
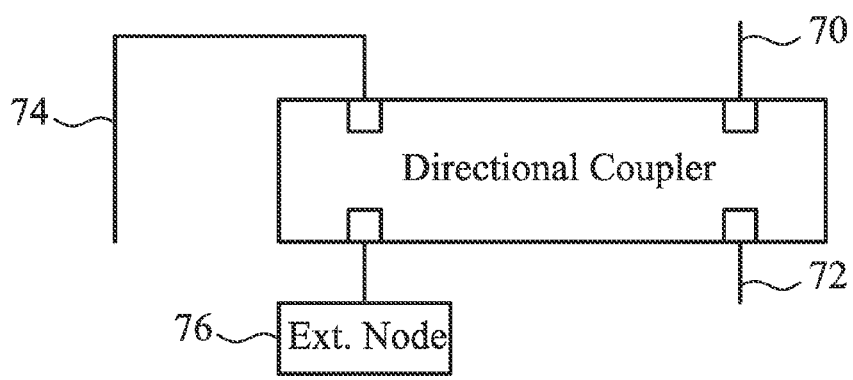
FIG. 7B shows a connection device implemented using a directional coupler according to an embodiment of the invention.

Referring to FIG. 7A again, the connection device 408 may contain an attenuator attenuating electrical signals passing through the terminals 70 and 74 by 20 dB. Referring to FIG. 7B, the connection device 408 may alternatively contain a directional coupler, in which the terminals 70 and 72 are connected as a through path, terminal 74 and an external node 76 are connected as a through path, terminals 70 and 74 are coupled as a coupled path and terminals 72 and 74 are isolated, with an isolation loss of around 20-40 dB, wherein the through path is a direct or indirect through path and the external node may be connected to a resistor (for example, a 50Ω resistor). Note that the through path between terminals 70 and 72 may have a path loss between 0.6 dB and 0.8 dB substantially, whereas the coupled path between terminals 70 and 74 may have a path loss between 9.5 dB and 10.5 dB substantially. Or, the through path between terminals 70 and 72 may have a path loss between 1.1 dB and 1.4 dB substantially, whereas the coupled path between terminals 70 and 74 may have a path loss between 5.7 dB and 6.3 dB substantially.

Figure 8A:
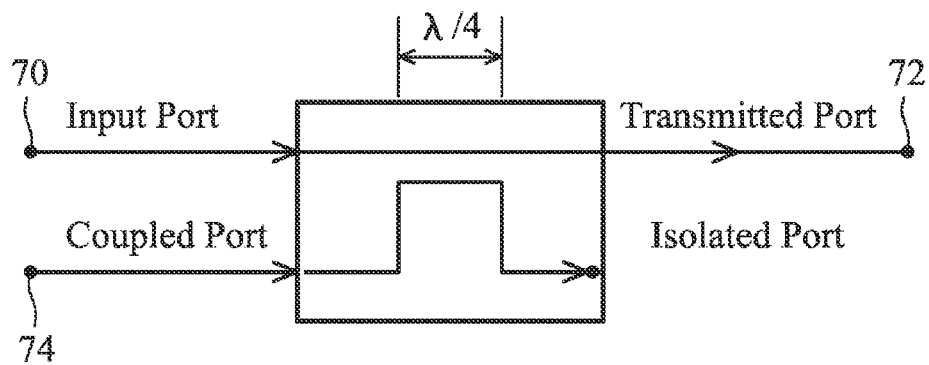
FIG. 8A shows a configuration of a connection device according to an embodiment of the invention.
Figure 8B:
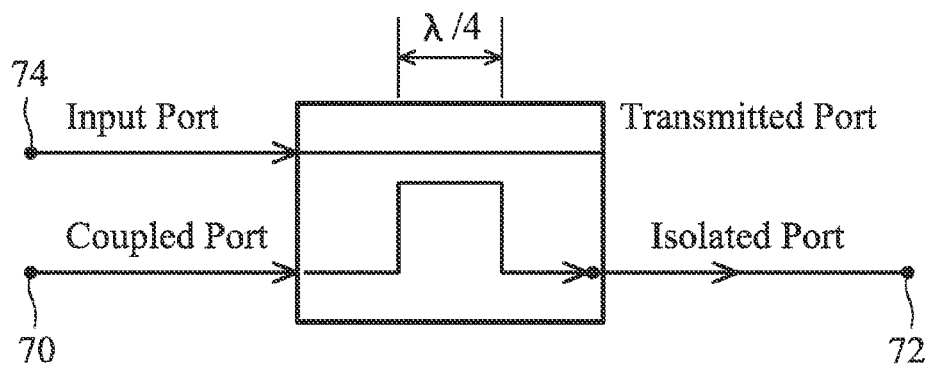
FIG. 8B yet shows a configuration of a connection device according to an embodiment of the invention.

Referring to FIG. 8A, by using two transmission lines set sufficiently close together such that electrical signals (or energy) directed from the terminal 70 (connected to a port called an input port) to the terminal 72 (connected to a port called a transmitted port) is coupled to the terminal 74 (connected to a port called a coupled port). Referring to FIG. 8B, similarly, electrical signals (or energy) directed from the terminals 74 (connected to a port called an input port) to a transmitted port (such as port 76 in FIG. 7B) is coupled to the terminal 70 (connected to a port called a coupled port) and isolated from the terminal 72 (connected to a port called an isolated port), such that the coupled signals can be added to the electrical signals passing through the terminals 72 to 70.

Figure 7C:
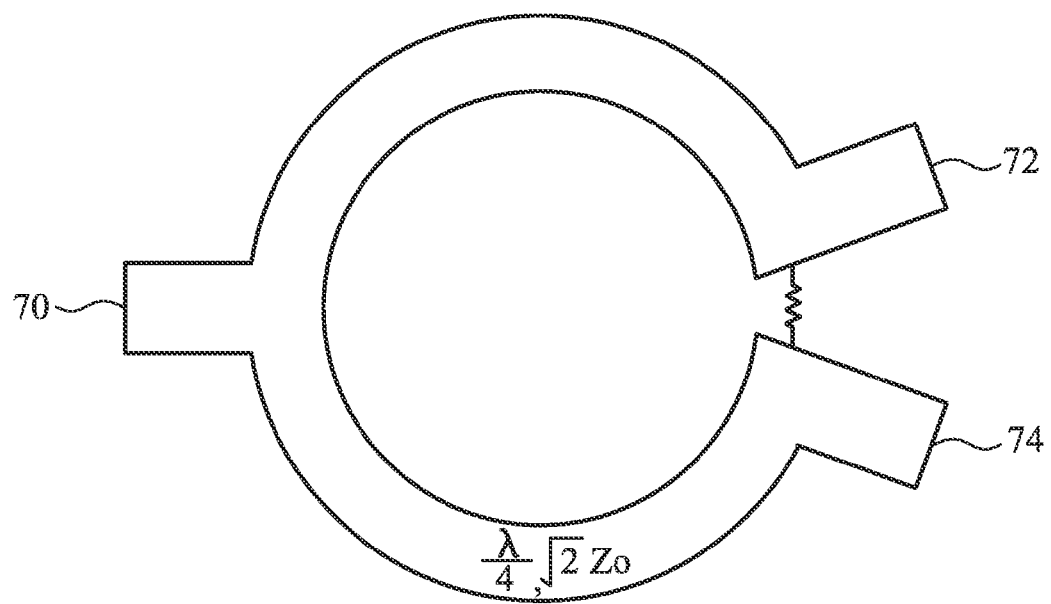
FIG. 7C shows a connection device implemented using a divider according to an embodiment of the invention.

As stated above, the connection device 408 may contain an attenuator (FIG. 7A) or a directional coupler (FIG. 7B). Alternatively, the connection device 408 may contain a power divider, as shown in FIG. 7C. In FIG. 7C, the terminals 72 and 74 are isolated and both ideally have a loss of 3 dB (3.5 dB in practice). Alternatively, the connection device 408 may contain a power splitter. The structure of the power splitter is similar to the power divider, but with different losses occurring between the output ports. For a power splitter, referring to FIG. 7C, the losses of terminals 72 and 74 are different. For example, the terminal 72 may have a loss of 10 dB, whereas the terminal 74 may have a loss of 0.5 dB, or the terminal 72 may have a loss of 6 dB, whereas the terminal 74 may have a loss of 1 dB. Alternatively, the connection device 408 may be implemented by a PCB pad with an input port and two output ports, in which one of the output ports has a loss of NdB and another output port has a loss of 1 dB or smaller, as designed based on requirement. Note the power splitter may be implemented using a directional coupler, such as the one of FIG. 7B, with the terminal 76 connected to a resistor for impedance matching and terminals 72 and 74 being isolated. With the power splitter implemented using a directional coupler as shown in FIG. 7B, the terminal 72 may have a loss of 10 dB, whereas the terminal 74 may have a loss of 0.5 dB, or the terminal 72 may have a loss of 6 dB, whereas the terminal 74 may have a loss of 1 dB.

Table 1 shows a combination of potential operations performed by the WLAN module 410 and the BLUETOOTH module 412, according to the system 400 of FIG. 4:

TABLE 1

| Case Type | Operation Type | | |
|---|---|---|---|
| | WLAN_Tx | WLAN_Rx | BT_Tx/BT_Rx |
| Case 1 | 0 | 0 | 0 |
| Case 2 | 0 | 0 | 1 |
| Case 3 | 0 | 1 | 0 |
| Case 4 | 0 | 1 | 1 |
| Case 5 | 1 | 0 | 0 |
| Case 6 | 1 | 0 | 1 |
| Case 7 | 1 | 1 | 0 |
| Case 8 | 1 | 1 | 1 |

In Table 1 above, "1" means TRUE, representing the existence of a corresponding operation, whereas "0" means FALSE, representing the absence of a corresponding operation. The situation for case 1 will not be discussed, as no operation exists. The cases 7 and 8, where the WLAN module 410 performs Tx and Rx operations simultaneously, is not permitted and therefore not discussed. The above cases will be discussed with references made to the flowcharts as shown in FIGS. 9A~9B.

Figure 9A:
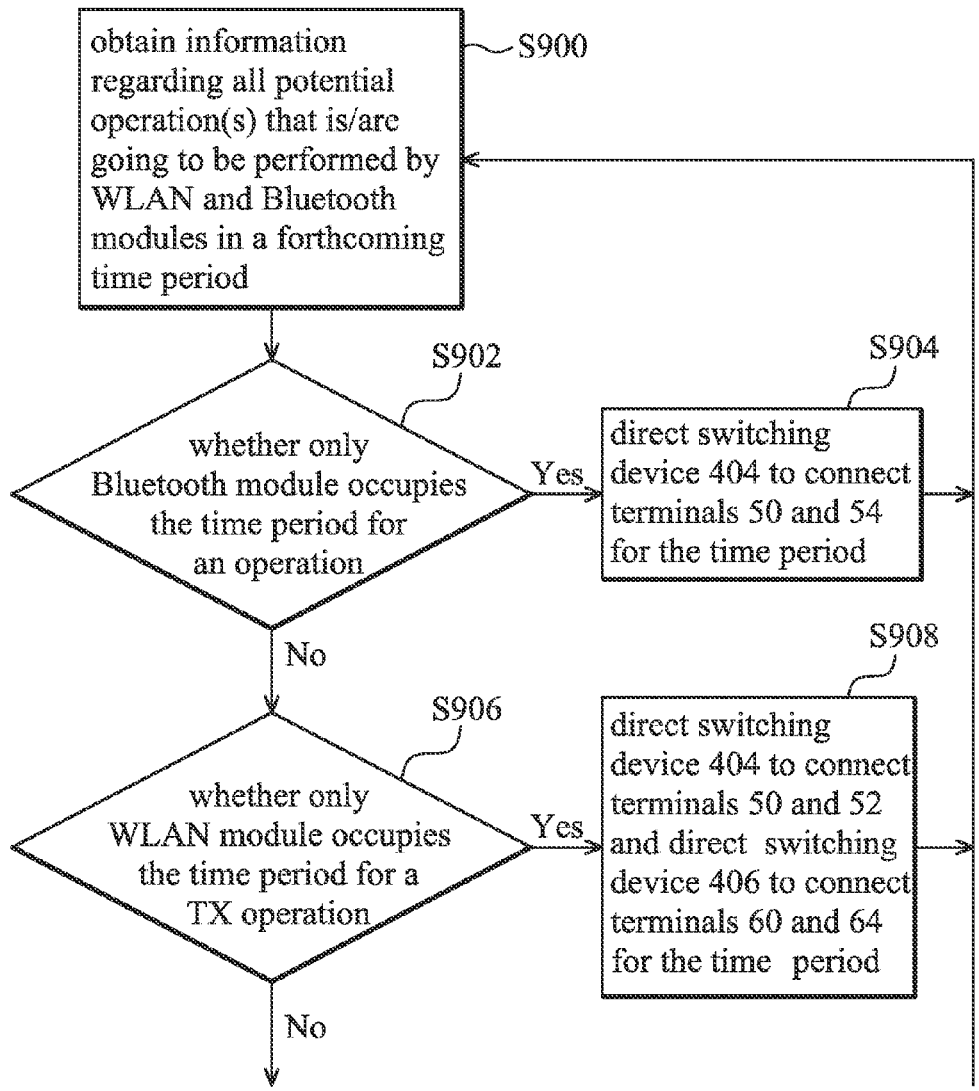
FIGS. 9A~9B show flowcharts for handling coexistence between WLAN and BLUETOOTH modules performed by the controller, according to an embodiment of the invention.
Figure 9B:
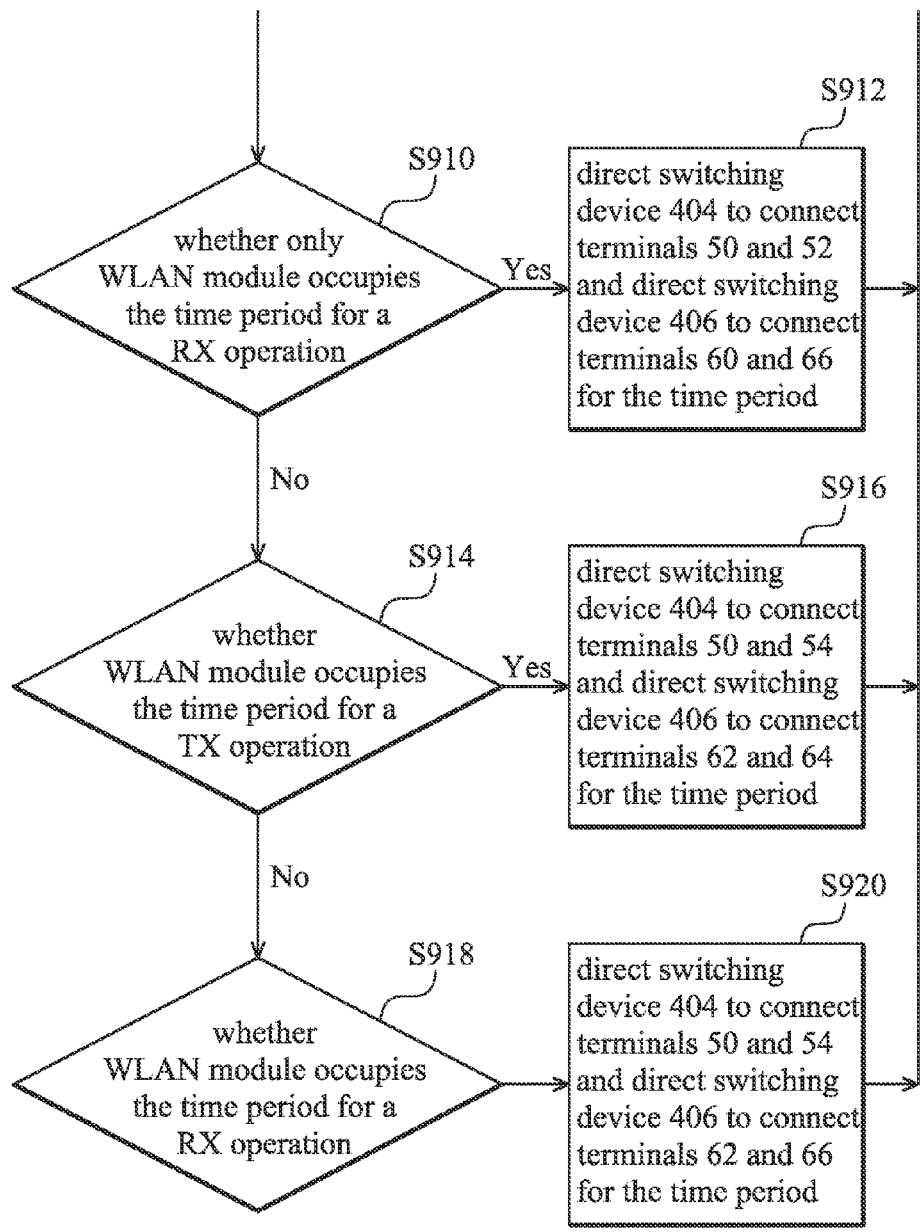
Figure 10A:
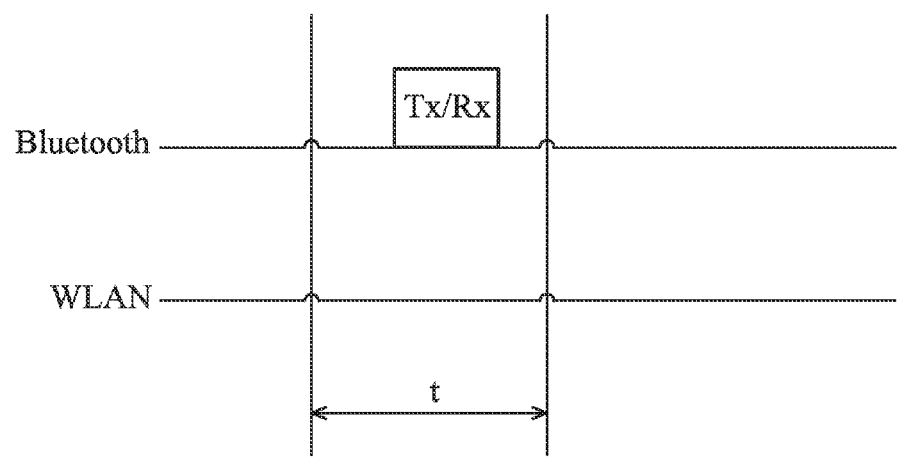
FIG. 10A shows a diagram illustrating a first case of possible WALN and BLUETOOTH operations within a time slot according to an embodiment of the invention.
Figure 10B:
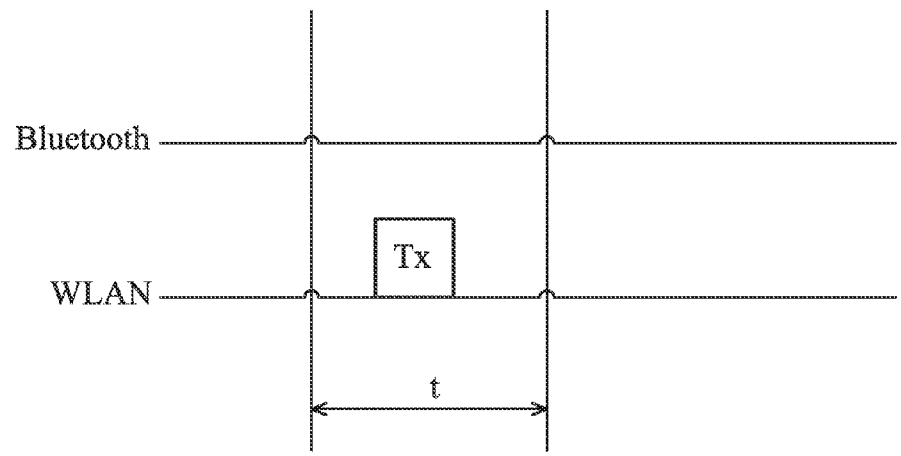
FIG. 10B shows a diagram illustrating a second case of possible WALN and BLUETOOTH operations within a time slot according to an embodiment of the invention.
Figure 10C:
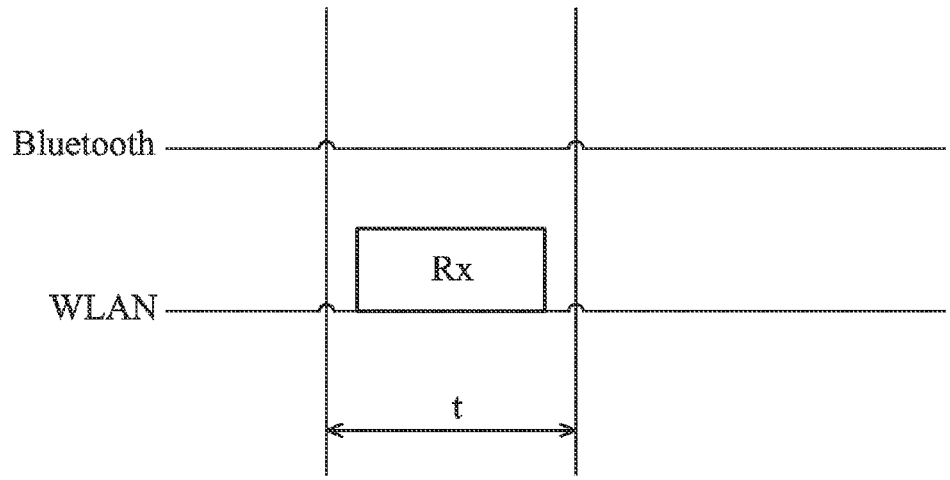
FIG. 10C shows a diagram illustrating a third case of possible WALN and BLUETOOTH operations within a time slot according to an embodiment of the invention.
Figure 10D:
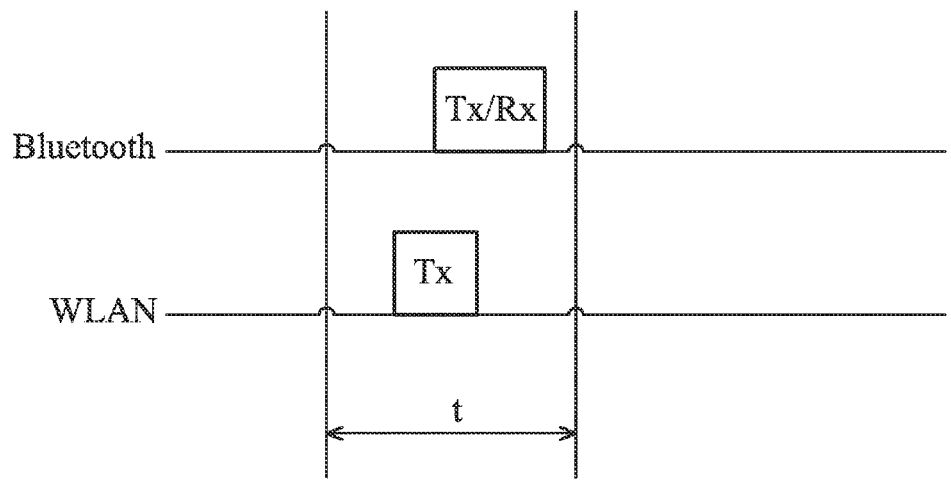
FIG. 10D shows a diagram illustrating a fourth case of possible WALN and BLUETOOTH operations within a time slot according to an embodiment of the invention.
Figure 10E:
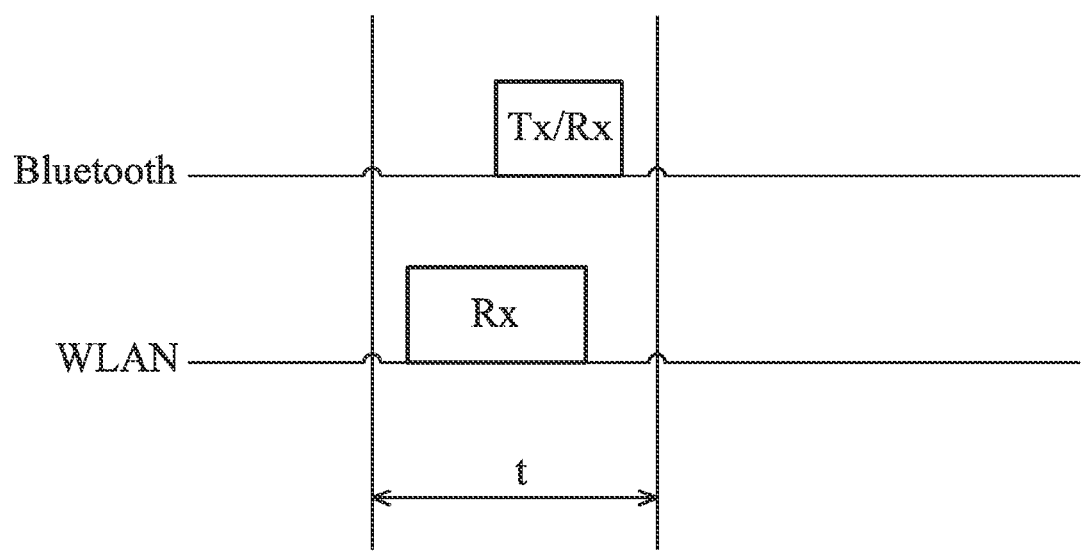
FIG. 10E shows a diagram illustrating a fifth case of possible WALN and BLUETOOTH operations within a time slot according to an embodiment of the invention.

FIGS. 9A and 9B show a flowchart for handling coexistence between WLAN and BLUETOOTH modules performed by the controller, according to an embodiment of the invention. The procedure begins at obtaining information regarding potential operation(s) that is/are going to be performed by the WLAN module 410 and BLUETOOTH module 412 in a forthcoming time period, which has/have been granted or scheduled by the controller 414. Subsequently, a series of inspections with respect to the obtained information are accordingly performed to determine whether only one or both of the WLAN module 410 and BLUETOOTH module 412 occupy the time period, and determine whether the time period is occupied for a Tx and/or an Rx operation. Specifically, the information regarding potential operation(s) that is/are going to be performed by the WLAN module 410 and BLUETOOTH module 412 in a forthcoming time period is obtained (step S900). Next, it is determined whether only the BLUETOOTH module 412 occupies the time period for an operation (Tx/Rx operation) (step S902). If so, the controller 414 directs the first switching device 404 to connect the terminals 50 and 54 for the time period as shown in FIG. 10A (case 2) (step S904), thereby enabling the BLUETOOTH Rx signals to be received by the BLUETOOTH module 412 from the single antenna 402 through terminals 50, 54, 70 and 72 in sequence, or enabling the BLUETOOTH Tx signals to be transmitted from the BLUETOOTH module 412 through terminals 72, 70, 54 and 50 in sequence to the single antenna 402. Subsequent to step S902, if not, it is determined whether only the WLAN module 410 occupies the time period for a Tx operation (step S906). If so, the controller 414 directs the first switching device 404 to connect the terminals 50 and 52 and directs the second switching device 406 to connect the terminals 60 and 64 for the time period as shown in FIG. 10B (case 5) (step S908), thereby enabling the WLAN Tx signals to be transmitted from the WLAN module 410 through terminals 64, 60, 52 and 50 in sequence to the single antenna 402. Subsequent to step S906, if not, it is determined whether only the WLAN module 410 occupies the time period for an Rx operation (step S910). If so, the controller 414 directs the first switching device 404 to connect the terminals 50 and 52 and directs the second switching device 406 to connect the terminals 60 and 66 for the time period as shown in FIG. 10C (case 3) (step S912), thereby enabling the WLAN Rx signals to be received by the WLAN module 410 from the single antenna 402 through terminals 50, 52, 60 and 66 in sequence. Subsequent to step S910, if not, it is determined whether the WLAN module 410 occupies the time period for a Tx operation (step S914). If so, the controller 414 directs the first switching device 404 to connect the terminals 50 and 54 and directs the second switching device 406 to connect the terminals 62 and 64 for the time period when the time period is occupied by the WLAN module 410 and BLUETOOTH module 412 for a BLUETOOTH Rx or Tx operation as well as a WLAN Tx operation as shown in FIG. 10D (case 6) (step S916), thereby enabling the WLAN Tx signals to be transmitted with a certain level of signal strength attenuation through terminals 64, 62, 74, 70, 54 and 50 in sequence from the WLAN module 410 to the antenna 402, and enabling the BLUETOOTH Rx signals to be received by the BLUETOOTH module 412 from the antenna 402 through terminals 50, 54, 70 and 72 in sequence, or the BLUETOOTH Tx signals to be transmitted from the BLUETOOTH module 412 through terminals 72, 70, 54 and 50 in sequence to the antenna 402. Subsequent to step S914, if not, it is determined whether the WLAN module 410 occupies the time period for an Rx operation (step S918). If so, the controller 414 directs the first switching device 404 to connect the terminals 50 and 54 and directs the second switching device 406 to connect the terminals 62 and 66 for the time period when the time period is occupied by both the WLAN module 410 and BLUETOOTH module 412 for a BLUETOOTH Rx or Tx operation as well as a WLAN Rx operation as shown in FIG. 10E (case 4) (step S920), thereby enabling the WLAN Rx signals to be received by the WLAN module 410 with a certain level of signal strength attenuation through terminals 50, 54, 70, 74, 62 and 66 in sequence from the antenna 402, and enabling the BLUETOOTH Rx signals to be received by the BLUETOOTH module 412 from the antenna 402 through terminals 50, 54, 70 and 72 in sequence, or the BLUETOOTH Tx signals to be transmitted from the BLUETOOTH module 412 through terminals 72, 70, 54 and 50 in sequence to the antenna 402.

Figure 11:
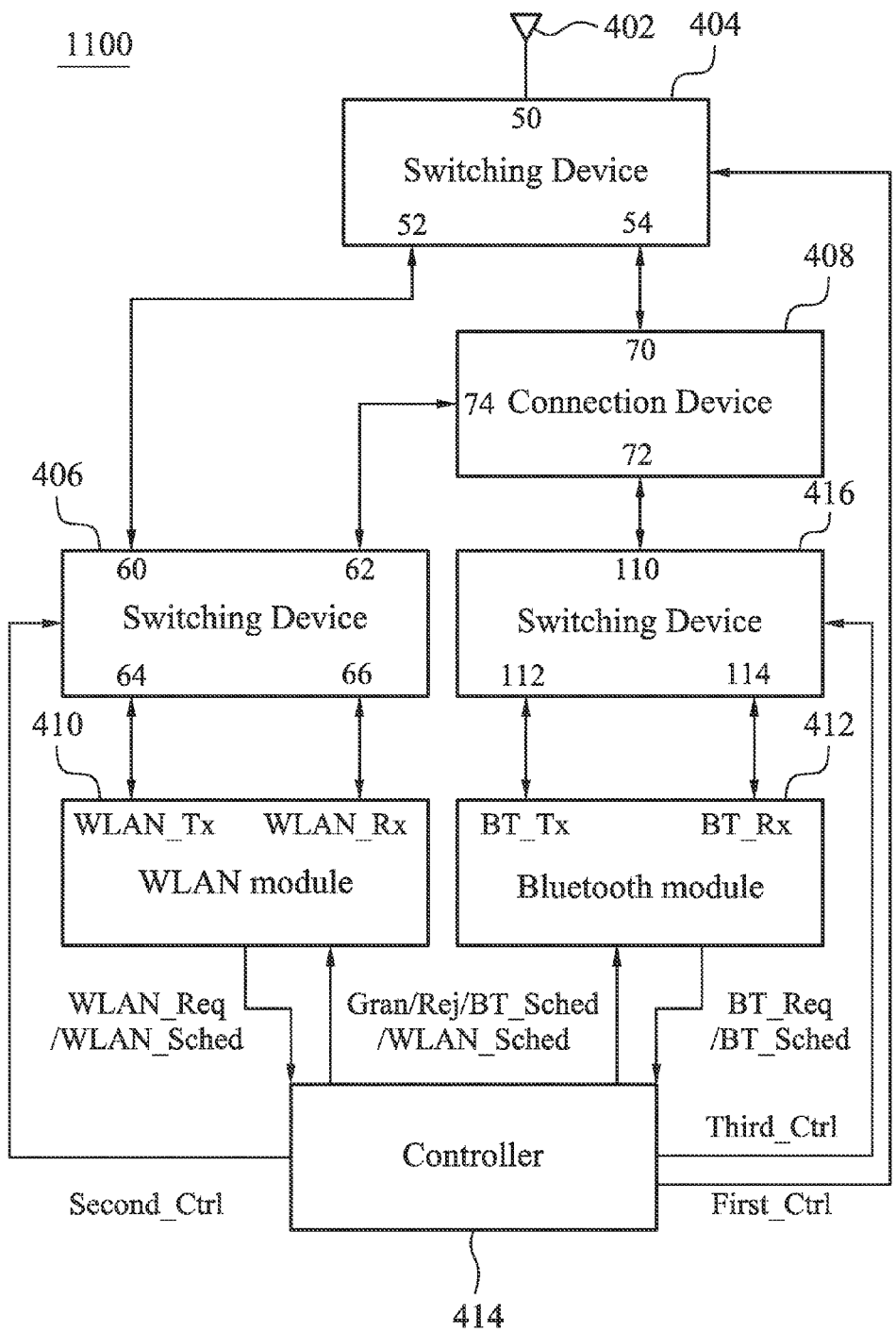
FIG. 11 shows another embodiment of a system for coexistence between a WLAN module and a BLUETOOTH module sharing a single antenna.

With the system 400 of FIG. 4, those skilled in the art may readily modify the hardware architecture thereof by separating the integrated port (labeled as BT_TRx of FIG. 4) into two ports (labeled as BT_Tx and BT_Rx) and disposing a switching device 416 between the connection device 408 and the BLUETOOTH Module 412 for connecting a terminal 110 to a terminal 112 or 114 depending on the BLUETOOTH operation type (e.g. a BLUETOOTH Tx or Rx operation), as the system 1100 shown in FIG. 11. The switching device 416 may be implemented by an SPDT switch. The controller 414 then controls three switching devices 404, 406 and 416 by control signals (labeled as First_Ctrl, Second_Ctrl and Third_Ctrl) to enable the WLAN module 410 and BLUETOOTH module 412 to transmit or receive data via the shared antenna 402.

Table 2 shows a combination of potential operations performed by the WLAN module 410 and the BLUETOOTH module 412, according to the system 1100 of FIG. 11:

TABLE 2

| Case Type | Operation Type | | | |
|---|---|---|---|---|
| | WLAN_Tx | WLAN_Rx | BT_Tx | BT_Rx |
| Case 1 | 0 | 0 | 0 | 0 |
| Case 2 | 0 | 0 | 0 | 1 |

TABLE 2-continued

| | Operation Type | | | |
|---|---|---|---|---|
| Case Type | WLAN_Tx | WLAN_Rx | BT_Tx | BT_Rx |
| Case 3 | 0 | 0 | 1 | 0 |
| Case 4 | 0 | 0 | 1 | 1 |
| Case 5 | 0 | 1 | 0 | 0 |
| Case 6 | 0 | 1 | 0 | 1 |
| Case 7 | 0 | 1 | 1 | 0 |
| Case 8 | 0 | 1 | 1 | 1 |
| Case 9 | 1 | 0 | 0 | 0 |
| Case 10 | 1 | 0 | 0 | 1 |
| Case 11 | 1 | 0 | 1 | 0 |
| Case 12 | 1 | 0 | 1 | 1 |
| Case 13 | 1 | 1 | 0 | 0 |
| Case 14 | 1 | 1 | 0 | 1 |
| Case 15 | 1 | 1 | 1 | 0 |
| Case 16 | 1 | 1 | 1 | 1 |

In Table 2 above, case 1 is not discussed as no operation exists. The cases 13 to 16, where the WLAN module 410 performs Tx and Rx operations simultaneously, is not permitted in the system 1100 and therefore not discussed. Based on the same reason, the cases 4, 8 and 12, where the BLUETOOTH module 412 performs Tx and Rx operations simultaneously, are also not discussed. The other cases will be discussed with references made to the flowcharts in FIGS. 12A~12C.

Figure 12A:
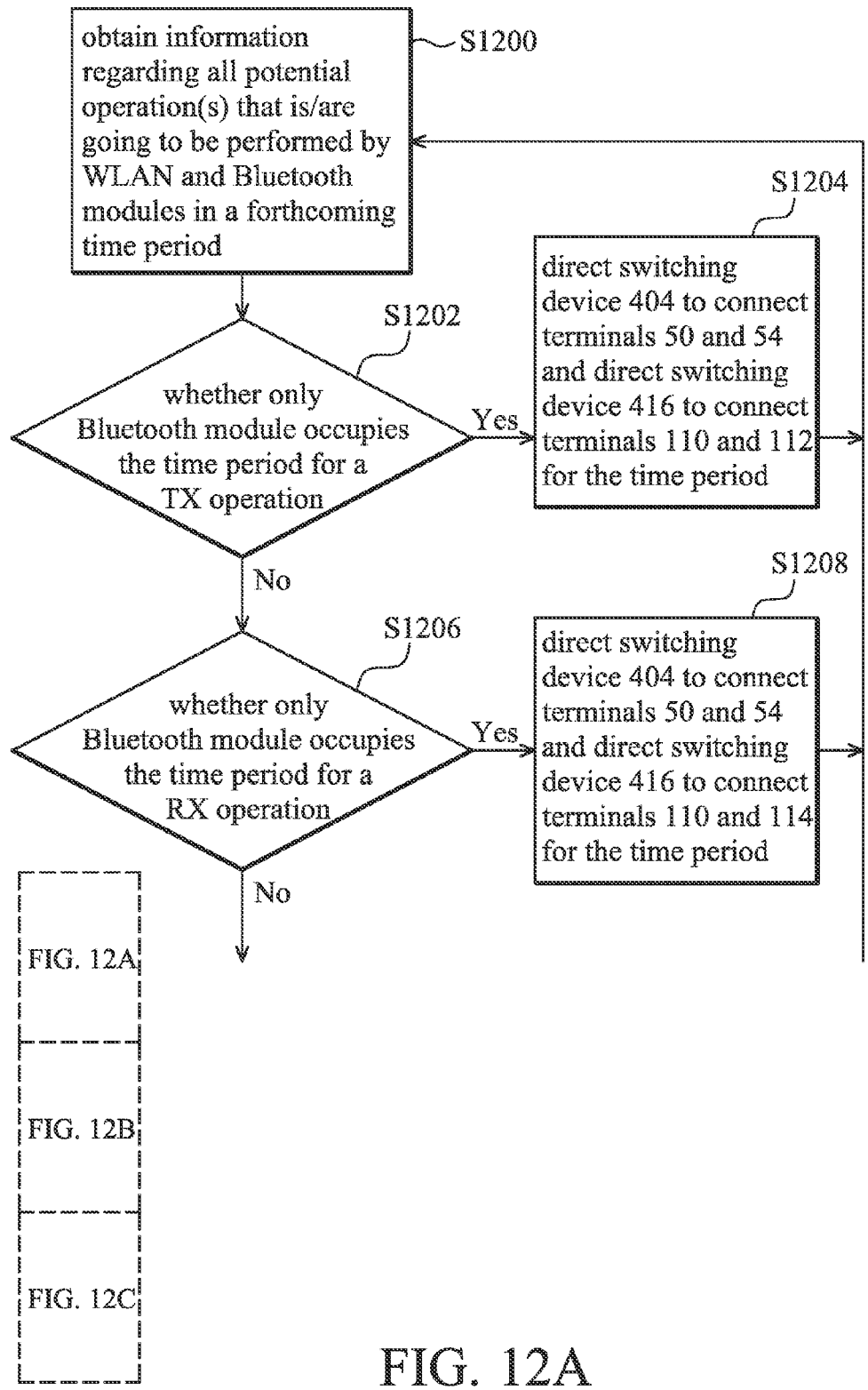
FIGS. 12A~12C show flowcharts for handling coexistence between WLAN and BLUETOOTH modules performed by the controller, according to another embodiment of the invention.
Figure 12B:
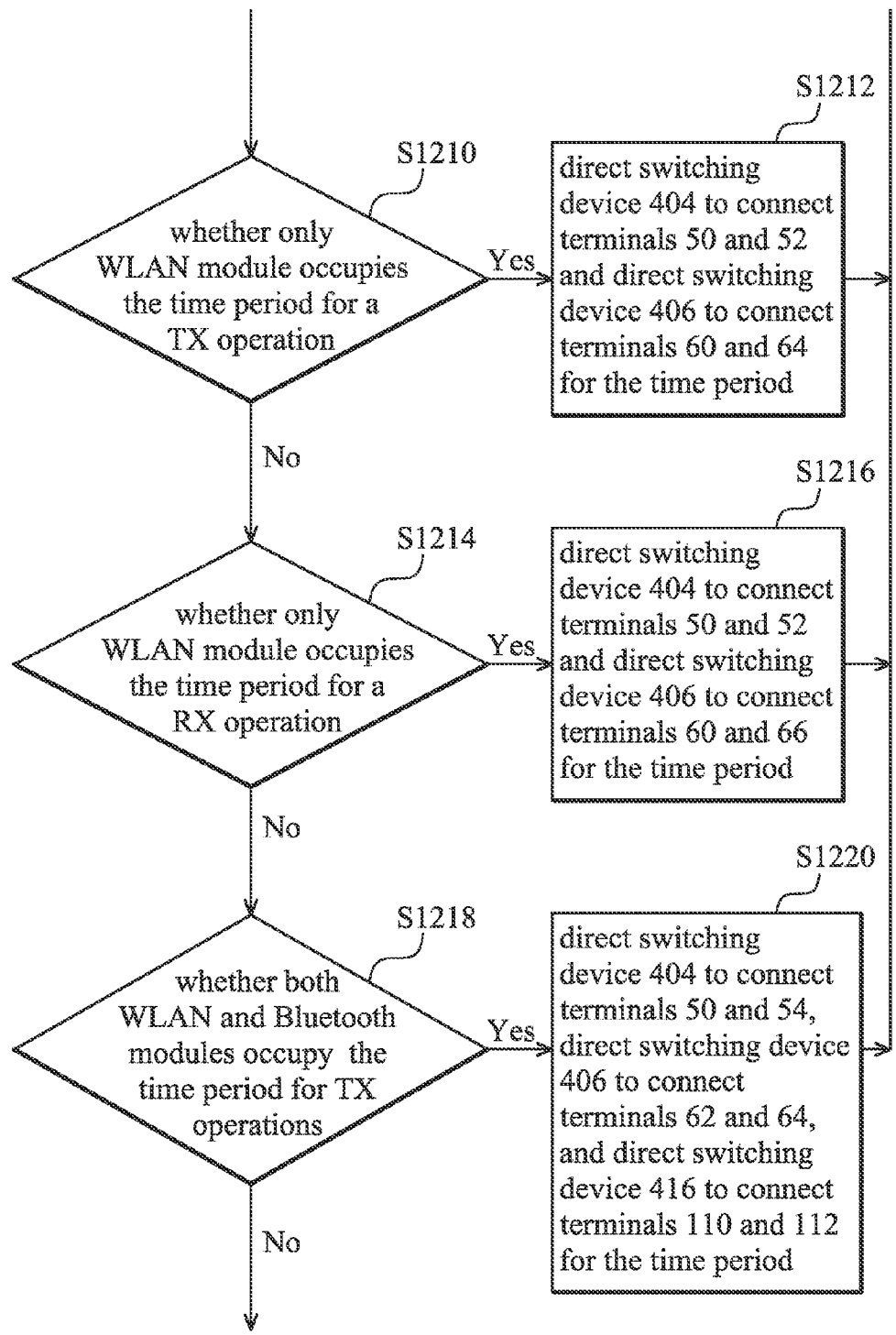
Figure 12C:
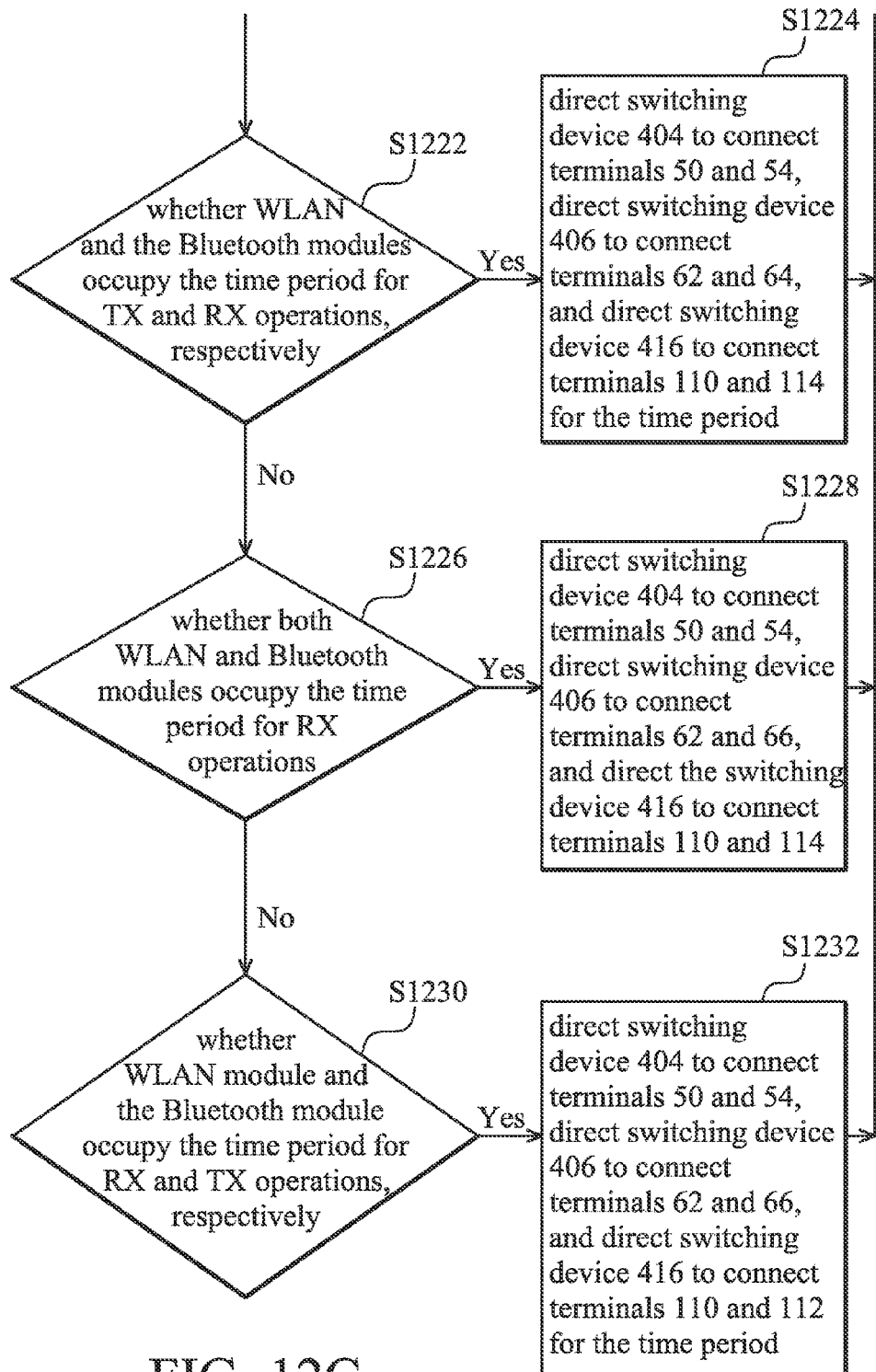

According to the modified architecture shown in FIG. 11, those skilled in the art may readily modify the control flow of FIGS. 9A and 9B to that of FIGS. 12A to 12C by incorporating more inspections and controls with respect to the newly added switching device 416. In FIGS. 12A~12C, the procedure begins at obtaining information regarding potential operation(s) that is/are going to be performed by the WLAN module 410 and BLUETOOTH module 412 in a forthcoming time period, which has/have been granted or scheduled by the controller 414 (step S1200). Next, it is determined whether only the BLUETOOTH module 412 occupies the time period for a Tx operation (step S1202). If so, the controller 414 directs the switching device 404 to connect the terminals 50 and 54 and directs the third switching device 416 to connect the terminals 110 and 112 for the time period when the time period is occupied by only the BLUETOOTH module 412 for a Tx operation (case 3) (step S1204), thereby enabling the Tx signals to be transmitted from the BLUETOOTH module 412 through terminals 112, 110, 72, 70, 54 and 50 in sequence to the shared antenna 402. Subsequent to step 1202, if not, it is determined whether only the BLUETOOTH module 412 occupies the time period for an Rx operation (step S1206). If so, the controller 414 directs the switching device 404 to connect the terminals 50 and 54 and directs the switching device 416 to connect terminals 110 and 114 for the time period when the time period is occupied by only the BLUETOOTH module 412 for an Rx operation (case 2) (step S1208), thereby enabling the BLUETOOTH Rx signals to be received by the BLUETOOTH module 412 from the shared antenna 402 through terminals 50, 54, 70, 72, 110 and 114 in sequence. Subsequent to step 1206, if not, it is determined whether only WLAN module 410 occupies the time period for a Tx operation (step S1210). If so, the controller 414 directs the switching device 404 to connect the terminals 50 and 52 and directs the switching device 406 to connect the terminals 60 and 64 for the time period when the time period is occupied by only WLAN module 410 for a Tx operation (case 9) (step S1212), thereby enabling the WLAN Tx signals to be transmitted from the WLAN module 410 through terminals 64, 60, 52 and 50 in sequence to the shared antenna 402. Subsequent to step 1210, if not, it is determined whether only WLAN module 410 occupies the time period for an Rx operation (step S1214). If so, the controller 414 directs the switching device 404 to connect the terminals 50 and 52 and directs the switching device 406 to connect the terminals 60 and 66 for the time period when the time period is occupied by only WLAN module 410 for an Rx operation (case 5) (step S1216), thereby enabling the WLAN Rx signals to be received by the WLAN module 410 from the shared antenna 402 through terminals 50, 52, 60 and 66 in sequence. Subsequent to step 1214, if not, it is determined whether both the WLAN module 410 and the BLUETOOTH module 412 occupy the time period for the Tx operations (step S1218). If so, the controller 414 directs the switching device 404 to connect the terminals 50 and 54, directs the switching device 406 to connect the terminals 62 and 64, and directs the switching device 416 to connect the terminals 110 and 112 for the time period when the time period is occupied by the BLUETOOTH module 412 for a BLUETOOTH Tx operation and the WLAN modules 410 for a WLAN Tx operation (case 11) (step S1220), thereby enabling the WLAN Tx signals to be transmitted with a certain level of signal strength attenuation through terminals 64, 62, 74, 70, 54 and 50 in sequence from the WLAN module 410 to the shard antenna 402, and enabling the BLUETOOTH Tx signals to be transmitted from the BLUETOOTH module 412 through terminals 112, 110, 72, 70, 54 and 50 in sequence to the antenna 402. Subsequent to step 1218, if not, it is determined whether the WLAN module 410 and the BLUETOOTH module 412 occupy the time period for the Tx and Rx operations, respectively (step S1222). If so, the controller 414 directs the switching device 404 to connect the terminals 50 and 54, directs the switching device 406 to connect the terminals 62 and 64, and directs the switching device 416 to connect the terminals 110 and 114 for the time period when the time period is occupied by the WLAN module 410 for a WLAN Tx operation and the BLUETOOTH module 412 for a BLUETOOTH Rx operation (case 10) (step S1224), thereby enabling the WLAN Tx signals to be transmitted with a certain level of signal strength attenuation through terminals 64, 62, 74, 70, 54 and 50 in sequence from the WLAN module 410 to the shared antenna 402, and enabling the BLUETOOTH Rx signals to be received by the BLUETOOTH module 412 from the shared antenna 402 through terminals 50, 54, 70, 72, 110 and 114 in sequence. Subsequent to step 1222, if not, it is determined whether both the WLAN module 410 and the BLUETOOTH module 412 occupy the time period for Rx operations (step S1226). If so, the controller 414 directs the switching device 404 to connect the terminals 50 and 54, directs the second switching device 406 to connect the terminals 62 and 66, and directs the third switching device 416 to connect the terminals 110 and 114 for the time period when the time period is occupied by the WLAN module 410 for a WLAN Rx operation and the BLUETOOTH module 412 for a BLUETOOTH Rx operation (case 6) (step S1228), thereby enabling the WLAN Rx signals to be received by the WLAN module 410 with a certain level of signal strength attenuation through terminals 50, 54, 70, 74, 62 and 66 in sequence from the shared antenna 402, and enabling the BLUETOOTH Rx signals to be received by the BLUETOOTH module 412 from the shared antenna 402 through terminals 50, 54, 70, 72, 110 and 114 in sequence from the shared antenna 402. Subsequent to step 1226, if not, it is determined whether the WLAN module 410 and the BLUETOOTH module 412 occupy the time period for Rx and Tx operations, respectively (step S1230). If so, the controller 414 directs the switching device 404 to connect the terminals 50 and 54, directs the switching device 406 to connect the terminals 62 and 66, and directs the switching device 416 to connect the terminals 110 and 112 for the time period when the time period is occupied by the WLAN module 410 for a WLAN Rx operation and the BLUETOOTH module 412 for a BLUETOOTH Tx operation (case 7) (step S1232), thereby enabling the WLAN Rx signals to be received by the WLAN module 410 with a certain level of signal strength attenuation through terminals 50, 54, 70, 74, 62 and 66 in sequence from the shared antenna 402, and enabling the BLUETOOTH Tx signals to be transmitted from the BLUETOOTH module 412 through terminals 112, 110, 72, 70, 54 and 50 in sequence to the shared antenna 402.

Figure 13:
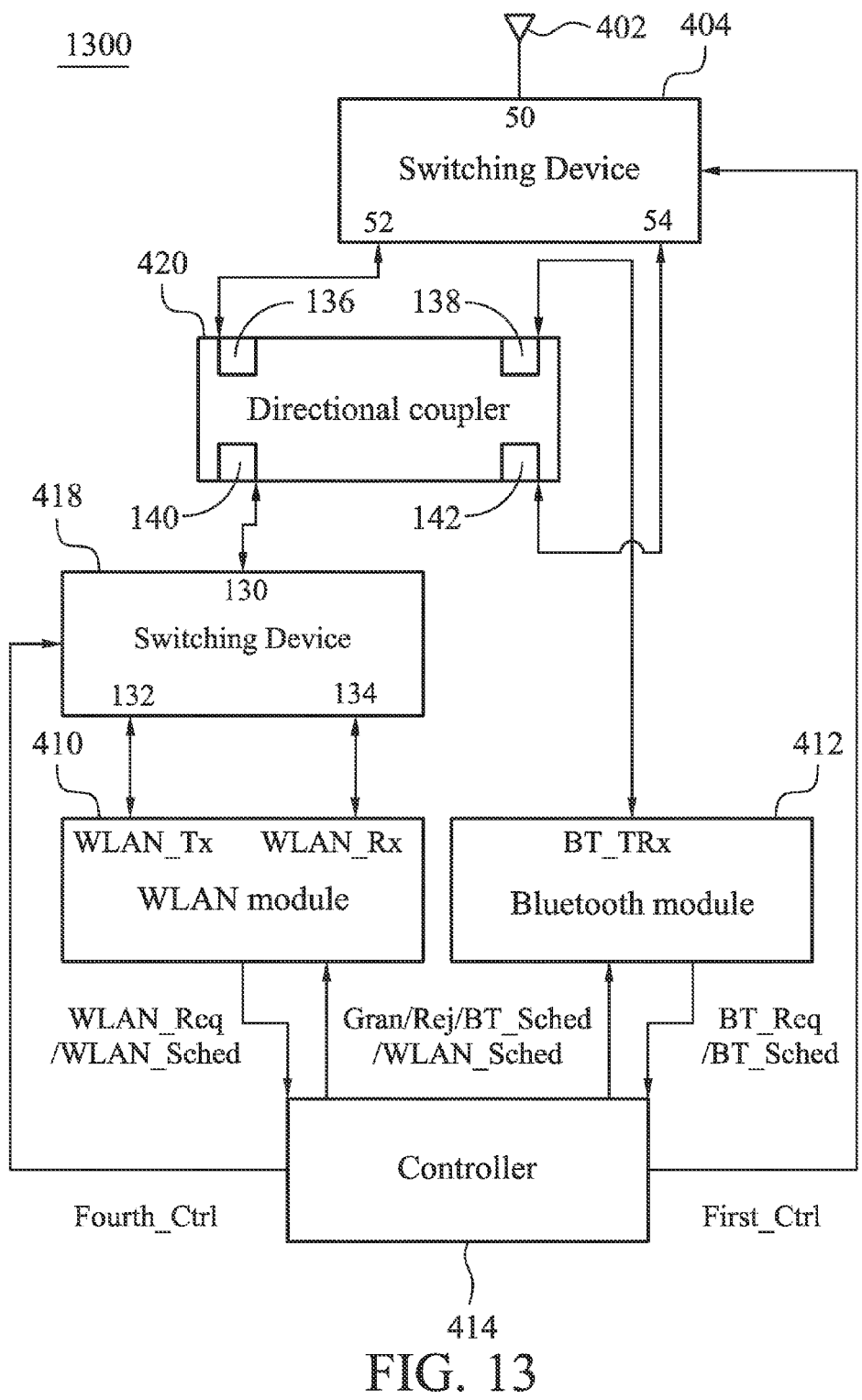
FIG. 13 shows another embodiment of a system for coexistence between a WLAN module and a BLUETOOTH module sharing a single antenna.

FIG. 13 shows another embodiment of a system for coexistence between a WLAN module and a BLUETOOTH module sharing a single antenna. Similar to the system 400 of FIG. 4, the system 1300 herein comprises an antenna 402, a switching device 404, a WLAN module 410, a BLUETOOTH module 412 and a controller 414. The same numerals in FIG. 13 represent similar elements of FIG. 4 without departing from the spirit of the invention, references of the WLAN module 410, BLUETOOTH module 412, switching device 404 and controller 414 may be made to the descriptions of FIG. 4 for brevity. A switching device 418 is configured to connect a terminal 130 to a terminal 132 or 134 as controlled by the controller 414, and may be implemented by an SPDT switch. The directional coupler 420 consists of four ports 136, 138, 140 and 142 which are connected to terminals 52, BT_TRx, 130 and 54 respectively, thereby enabling the terminals 54 and BT_TRx to be connected via a first through path, terminals 52 and 130 to be connected via a second through path, BT_TRx and 130 to be isolated (with substantially 20 dB of isolation or more), terminal 54 and 52 to be isolated (with substantially 20 dB of isolation or more), terminals BT_TRx and 52 to be coupled as a first coupled path and terminals 130 and 54 to be coupled as a second coupled path, wherein the first and second through paths are direct or indirect through paths. The switching devices 404 and 418, directional coupler 420, WLAN module 410, BLUETOOTH module 412 and controller 414 may be disposed on a PCB. Note the first and second through paths may have a loss of 0.5 dB substantially, whereas the first and second coupled paths may have a loss of 10 dB substantially, or the first and second through paths may have a loss of 1 dB substantially, whereas the first and second coupled paths may have a loss of 6 dB substantially.

Figure 14A:
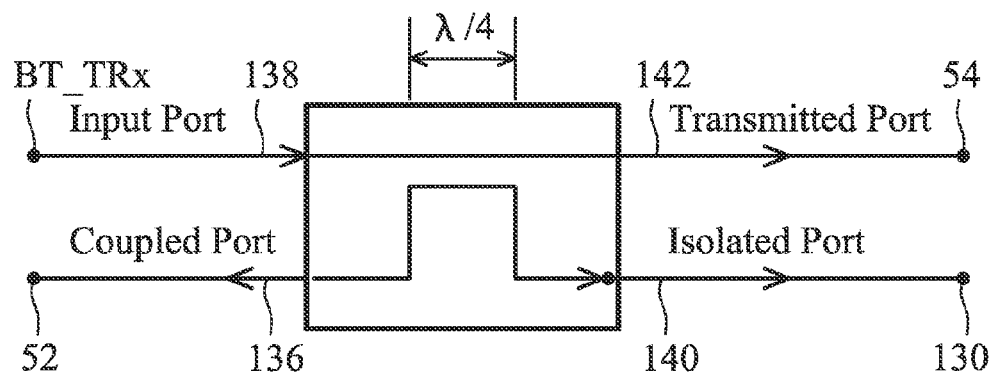
FIG. 14A shows a configuration of a directional coupler according to an embodiment of the invention.
Figure 14B:
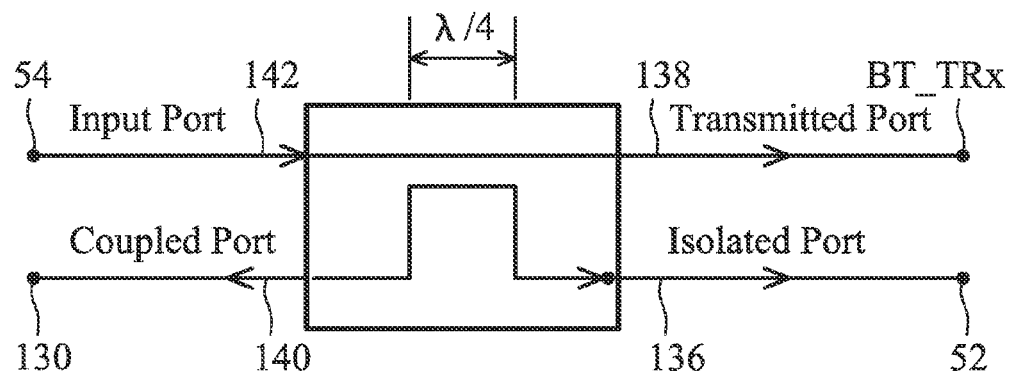
FIG. 14B yet shows a configuration of a directional coupler according to an embodiment of the invention.
Figure 14C:
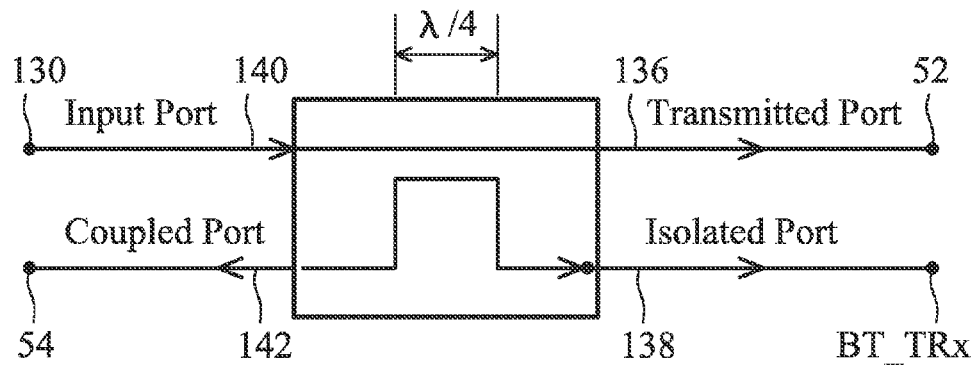
FIG. 14C yet shows a configuration of a directional coupler according to an embodiment of the invention.
Figure 14D:
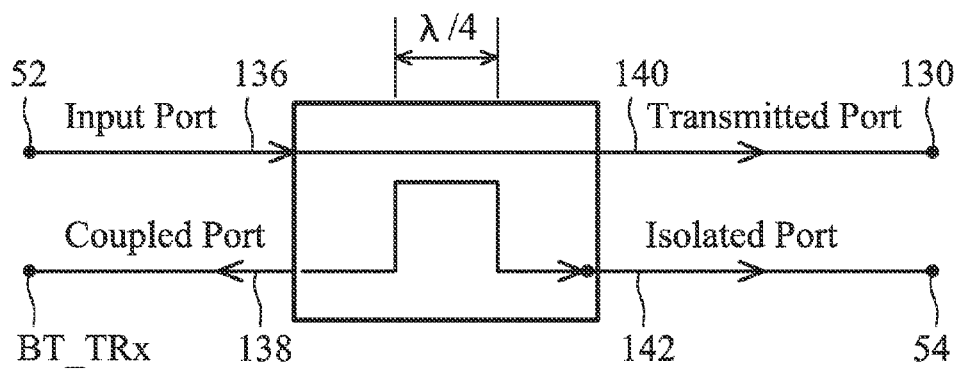
FIG. 14D yet shows a configuration of a directional coupler according to an embodiment of the invention.

Referring to FIG. 14A, by using two transmission lines set sufficiently close together, electrical signals (or energy) directed from the terminal BT_TRx (connected to the port 138 called an input port) to terminal 54 (connected to the port 142 called a transmitted port) is coupled to the terminal 52 (connected to the port 136 called a coupled port) and is isolated from the terminal 130 (connected to the port 140 called an isolated port), such that the coupled signals can be added to electrical signals passing through the terminals 130 to 52. Referring to FIG. 14B, by using two transmission lines set sufficiently close together, electrical signals directed from the terminals 54 (connected to the port 142 called an input port) to terminal BT_TRx (connected to the port 138 called a transmitted port) is coupled to the terminal 130 (connected to the port 140 called a coupled port) and isolated from the terminal 52 (connected to the port 136 called an isolated port), such that the coupled signals can be added to electrical signals passing through the terminals 52 to 130. Referring to FIG. 14C, similarly, electrical signals directed from terminals 130 to 52 is coupled to the terminal 54 and can be added to electrical signals passing through the terminals BT_TRx to 54. Referring to FIG. 14D, similarly, electrical signals passing through the terminals 52 to 130 is coupled the terminal BT_TRx and can be added to electrical signals passing through the terminals 54 to BT_TRx.

Table 3 shows a combination of potential operations performed by the WLAN module 410 and the BLUETOOTH module 412, according to the system 1300 in FIG. 13:

TABLE 3

| | Operation Type | | | |
|---|---|---|---|---|
| Case Type | WLAN_Tx | WLAN_Rx | BT_Tx/ BT_Rx | Signal Strength Attenuation For WLAN or BT |
| Case 1 | 0 | 0 | 0 | None |
| Case 2 | 0 | 0 | 1 | None |
| Case 3 | 0 | 1 | 0 | None |
| Case 4A | 0 | 1 | 1 | WLAN |
| Case 4B | | | | BT |
| Case 5 | 1 | 0 | 0 | None |
| Case 6A | 1 | 0 | 1 | WLAN |
| Case 6B | | | | BT |
| Case 7 | 1 | 1 | 0 | None |
| Case 8 | 1 | 1 | 1 | None |

In Table 3 above, the case 1 is not discussed as no operation exists. The cases 7 and 8, where the WLAN module 410 performs Tx and Rx operations simultaneously, is not permitted in the system 1300 and therefore not discussed. The other cases will be discussed with references made to the flowcharts in FIGS. 15A~15C.

Figure 15A:
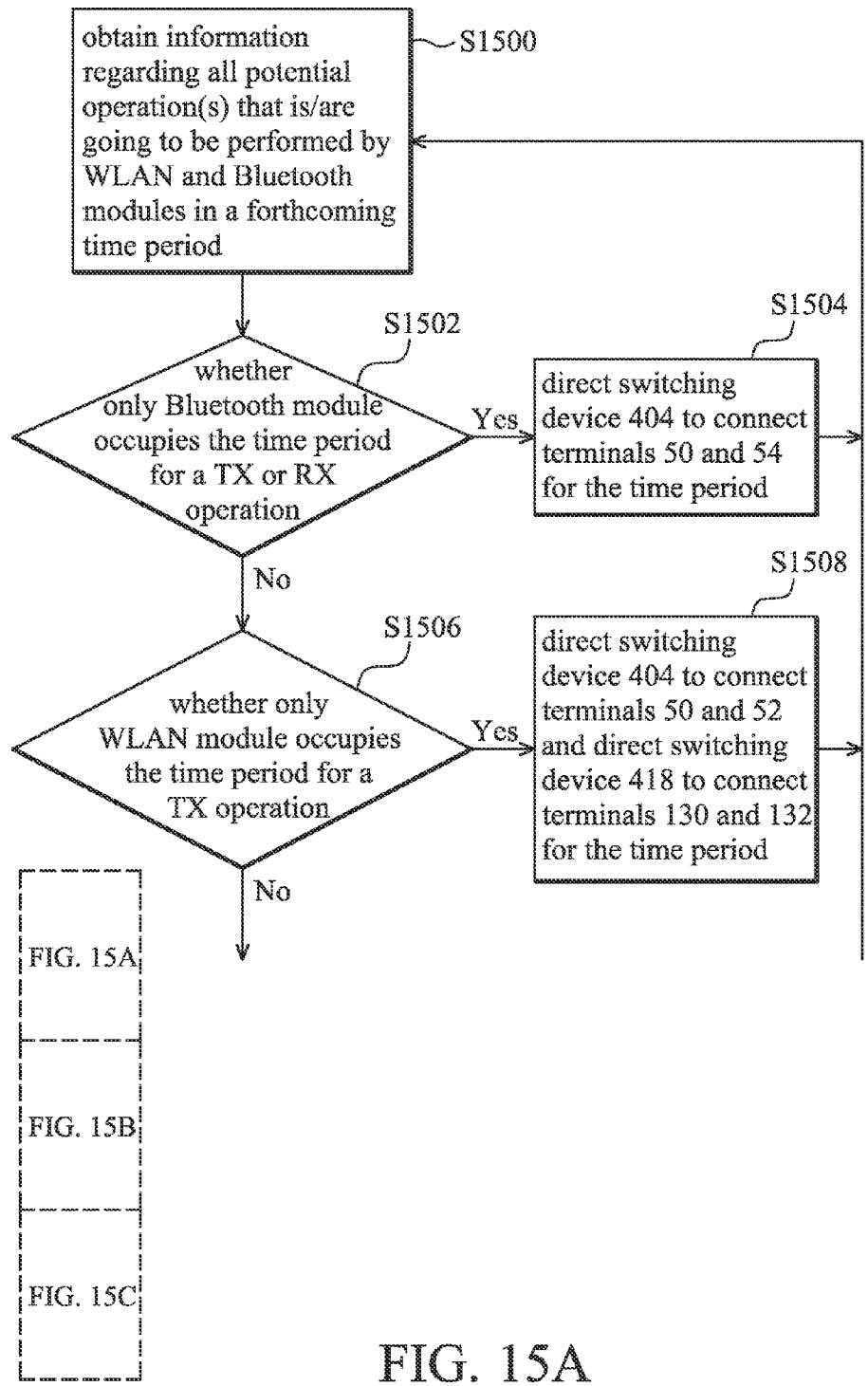
FIGS. 15A~15C show flowcharts for handling coexistence between WLAN and BLUETOOTH modules performed by the controller, according to another embodiment of the invention.
Figure 15B:
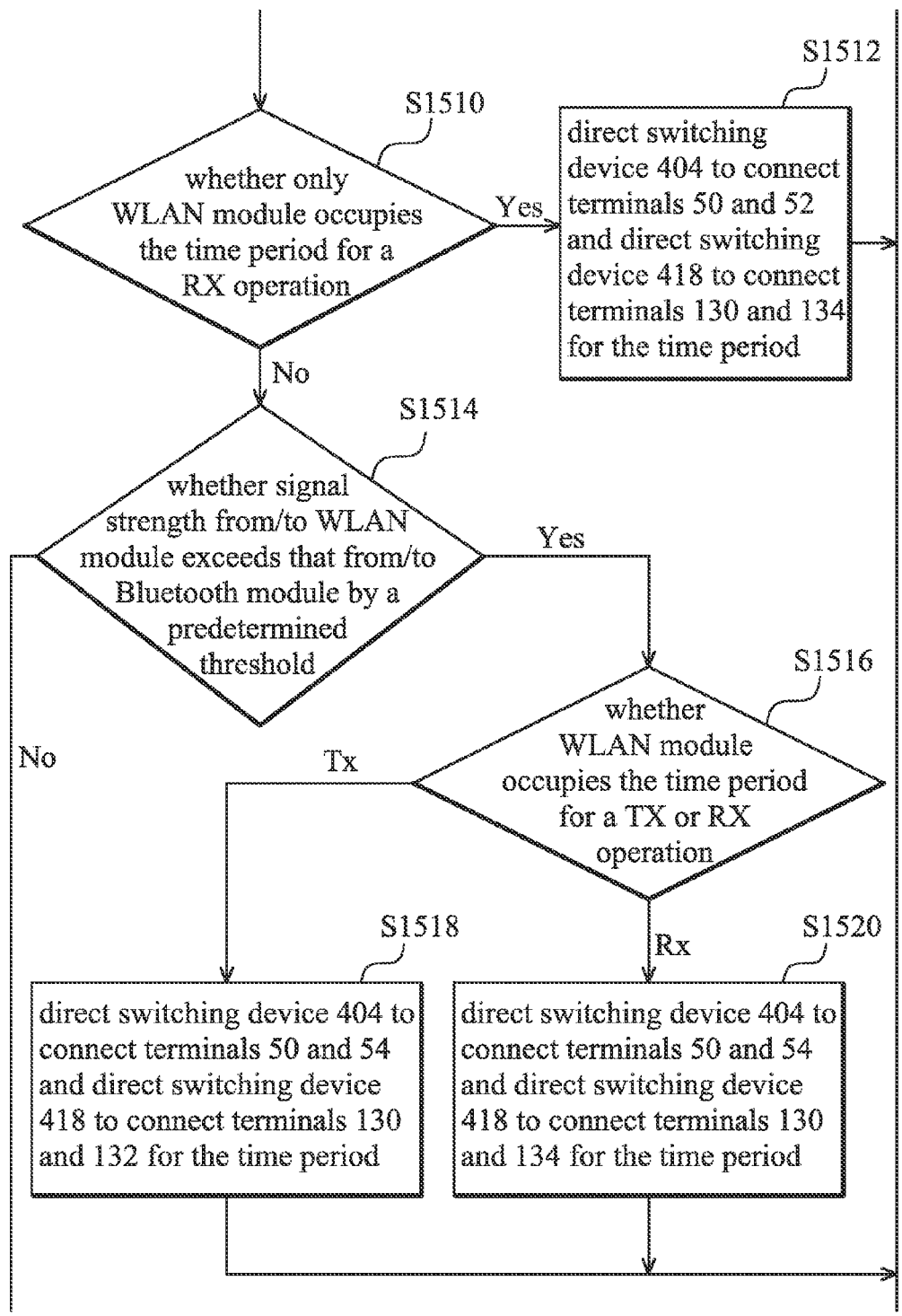
Figure 15C:
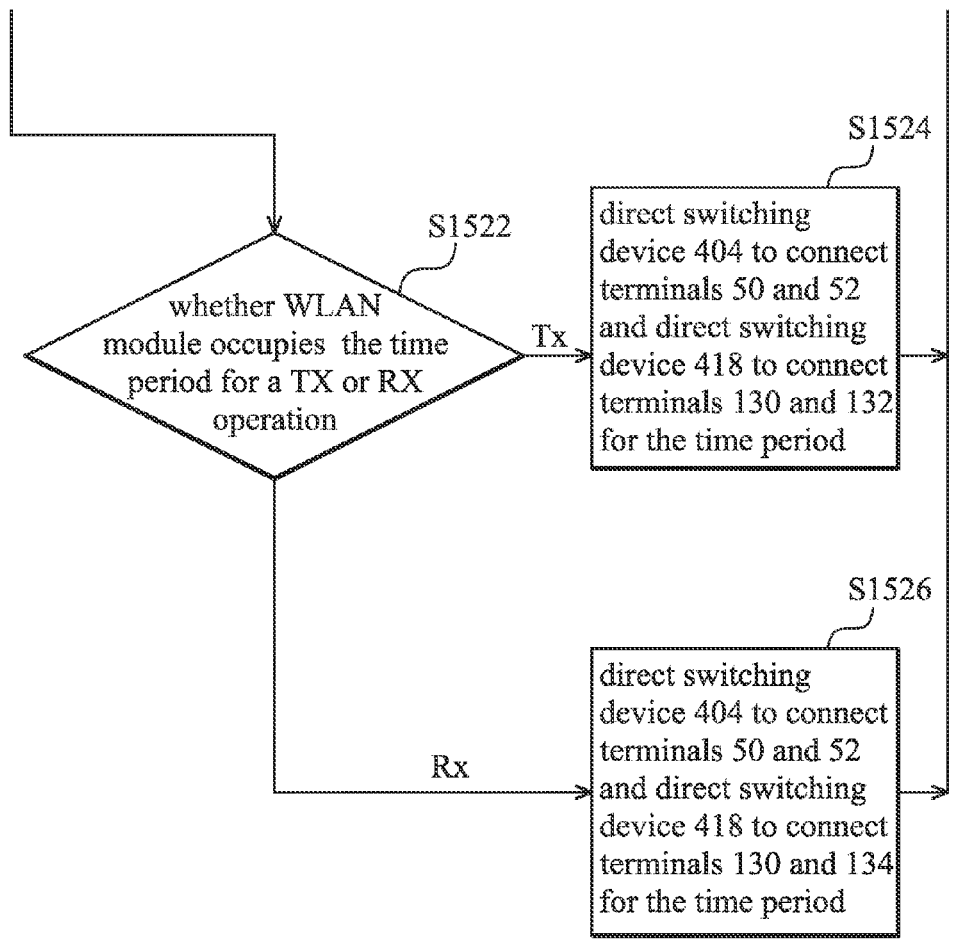

According to the hardware architecture shown in FIG. 13, those skilled in the art may readily modify the control flow of FIGS. 9A~9B to that of FIGS. 15A~15C by incorporating similar but different inspections and controlling methods with respect to the switching devices 404 and 418. In FIGS. 15A~15C, the procedure begins at obtaining information regarding all potential operation(s) that is/are going to be performed by the WLAN module 410 and BLUETOOTH module 412 in a forthcoming time period, which has/have been granted or scheduled by the controller 414 (step S1500). Next it is determined whether only the BLUETOOTH module 412 occupies the time period for a Tx or Rx operation (step S1502). If so, the controller 414 directs the switching device 404 to connect terminals 50 and 54 for the time period as shown in FIG. 10A (case 2) (step S1504), thereby enabling the BLUETOOTH Rx signals to be received by the BLUETOOTH module 412 from the shared antenna 402 through terminals 50 and 54, and ports 142 and 138 in sequence, or enabling the BLUETOOTH Tx signals to be transmitted from the BLUETOOTH module 412 through ports 138 and 142, and terminals 54 and 50 in sequence to the shared antenna 402. Subsequent to step S1502, if not, it is determined whether only the WLAN module 410 occupies the time period for a Tx operation (step S1506). If so, the controller 414 directs the switching device 404 to connect terminals 50 and 52 and directs the switching device 418 to connect terminals 130 and 132 for the time period as shown in FIG. 10B (case 5) (step S1508), thereby enabling the WLAN Tx signals to be transmitted from the WLAN module 410 through terminals 132 and 130, ports 140 and 136, and terminals 52 and 50 in sequence to the shared antenna 402. Subsequent to step S1506, if not, it is determined whether only the WLAN module 410 occupies the time period for an Rx operation (step S1510). If so, the controller 414 directs the switching device 404 to connect terminals 50 and 52 and directs the switching device 418 to connect terminals 130 and 134 for the time period as shown in FIG. 10C (case 3) (step S1512), thereby enabling the WLAN Rx signals to be received by the WLAN module 410 from the shared antenna 402 through terminals 50 and 52, ports 136 and 140, and terminals 130 and 134 in sequence. Subsequent to step S1510, if not, it is determined whether signal strength from/to the WLAN module 410 exceeds that from/to BLUETOOTH module 412 by a predetermined threshold (step S1514). If the signal strength of the WLAN module 410 exceeds the signal strength of the BLUETOOTH module 412 by the predetermined threshold, it is determined whether the WLAN module 410 occupies the time period for a Tx or Rx operation (step S1516). If a WLAN Tx operation is performed, the controller 414 directs the switching device 404 to connect terminals 50 and 54 and directs the switching device 418 to connect terminals 130 and 132 for the time period when the time period is occupied by the BLUETOOTH module 412 for an Rx or Tx operation as well as by the WLAN module 410 for a Tx operation as shown in FIG. 10D (case 6A) (step S1518), thereby enabling the WLAN Tx signals to be transmitted with a certain level of signal strength attenuation through terminals 132 and 130, ports 140 and 142, and terminals 54 and 50 in sequence from the WLAN module 410 to the shared antenna 402, and enabling the BLUETOOTH Tx signals to be transmitted from the BLUETOOTH module 412 through ports 138 and 142, and terminals 54 and 50 in sequence to the shared antenna 402, or enabling the BLUETOOTH Rx signals to be received by the BLUETOOTH module 412 from the shared antenna 402 through terminals 50 and 54, and ports 142 and 138 in sequence. Subsequent to step S1516, if a WLAN Rx operation is performed, the controller 414 directs the switching device 404 to connect terminals 50 and 54 and directs the switching device 418 to connect terminals 130 and 134 for the time period when the time period is occupied by the BLUETOOTH module 412 for an Rx or Tx operation as well as by the WLAN module 410 for an Rx operation as shown in FIG. 10E (case 4A) (step S1520), thereby enabling the WLAN Rx signals to be received by the WLAN module 410 with a certain level of signal strength attenuation through from the shared antenna 402 terminals 50 and 54, ports 142 and 140, and terminals 130 and 134 in sequence, and enabling the BLUETOOTH Tx signals to be transmitted from the BLUETOOTH module 412 through ports 138 and 142, and terminals 54 and 50 in sequence to the shared antenna 402, or enabling the BLUETOOTH Rx signals to be received by the BLUETOOTH module 412 from the shared antenna 402 through the terminals 50 and 54, and ports 142 and 138 in sequence. Subsequent to step S1514, if signal strength from/to the WLAN module 410 does not exceed signal strength from/to the BLUETOOTH module 412 by the predetermined threshold, it is determined whether the WLAN module 410 occupies the time period for a Tx or Rx operation (step S1522). If a WLAN Tx operation is performed, the controller 414 directs the switching device 404 to connect terminals 50 and 52 and directs the switching device 418 to connect terminals 130 and 132 for the time period when the time period is occupied by the BLUETOOTH module 412 for an Rx or Tx operation as well as by the WLAN module 410 for a Tx operation as shown in FIG. 10D (case 6B) (step S1524), thereby enabling the WLAN Tx signals to be transmitted from the WLAN module 410 through terminals 132 and 130, ports 140 and 136, and terminals 52 and 50 in sequence to the shard antenna 402, and enabling the BLUETOOTH Tx signals to be transmitted with a certain level of signal strength attenuation through ports 138, and 136, and terminals 52 and 50 in sequence from the BLUETOOTH module 412 to the shared antenna 402, or enabling the BLUETOOTH Rx signals to be received by the BLUETOOTH module 412 with a certain level of signal strength attenuation through terminals 50 and 52, and ports 136 and 138 in sequence from the shared antenna 402. Subsequent to step S1522, if a WLAN Rx operation is performed, the controller 414 directs the switching device 404 to connect terminals 50 and 52 and directs the switching device 418 to connect terminals 130 and 134 for the time period when the time period is occupied by the BLUETOOTH module 412 for an Rx or Tx operation as well as by the WLAN module 410 for an Rx operation as shown in FIG. 10E (case 4B) (step S1526), thereby enabling the WLAN Rx signals to be received by the WLAN module 410 from the shared antenna 402 through terminals 50 and 52, ports 136 and 140, and terminals 130 and 134 in sequence, and enabling the BLUETOOTH Tx signals to be transmitted with a certain level of signal strength attenuation through ports 138 and 136, and terminals 52 and 50 in sequence from the BLUETOOTH module 412 to the shared antenna 402, or enabling the BLUETOOTH Rx signals to be received with a certain level of signal strength attenuation through terminals 50 and 52, and ports 136 and 138 in sequence from the shared antenna 402 to the BLUETOOTH module 412.

Note that in the embodiment of FIG. 13, when the operation type of the WLAN module 410 is an Rx operation and the operation type of the BLUETOOTH module 412 is a Tx operation and the Tx power level of the BLUETOOTH module 412 is higher than the Rx power level of the WLAN module 410 by a certain level, the controller 414 may control the switching device 404 to connect the terminals 50 and 52 such that the WLAN Rx signal is received via the through path between ports 136 and 140, and the BLUETOOTH Tx signal is transmitted via the coupled path between ports 136 and 138 with greater loss. This is to prevent the BLUETOOTH Tx operation from interfering with the WLAN Rx operation. Similarly, when the operation type of the WLAN module 410 is a Tx operation and the operation type of the BLUETOOTH module 412 is an Rx operation and the Tx power level of the WLAN module 410 is higher than the Rx power level of the BLUETOOTH module 412 by a certain level, the controller 414 may control the switching device 404 to connect the terminals 50 and 54 such that the WLAN Tx signal is transmitted via the coupled path between ports 140 and 142 with greater loss, and the BLUETOOTH Rx signal is received via the through path between ports 138 and 142.

Figure 16:
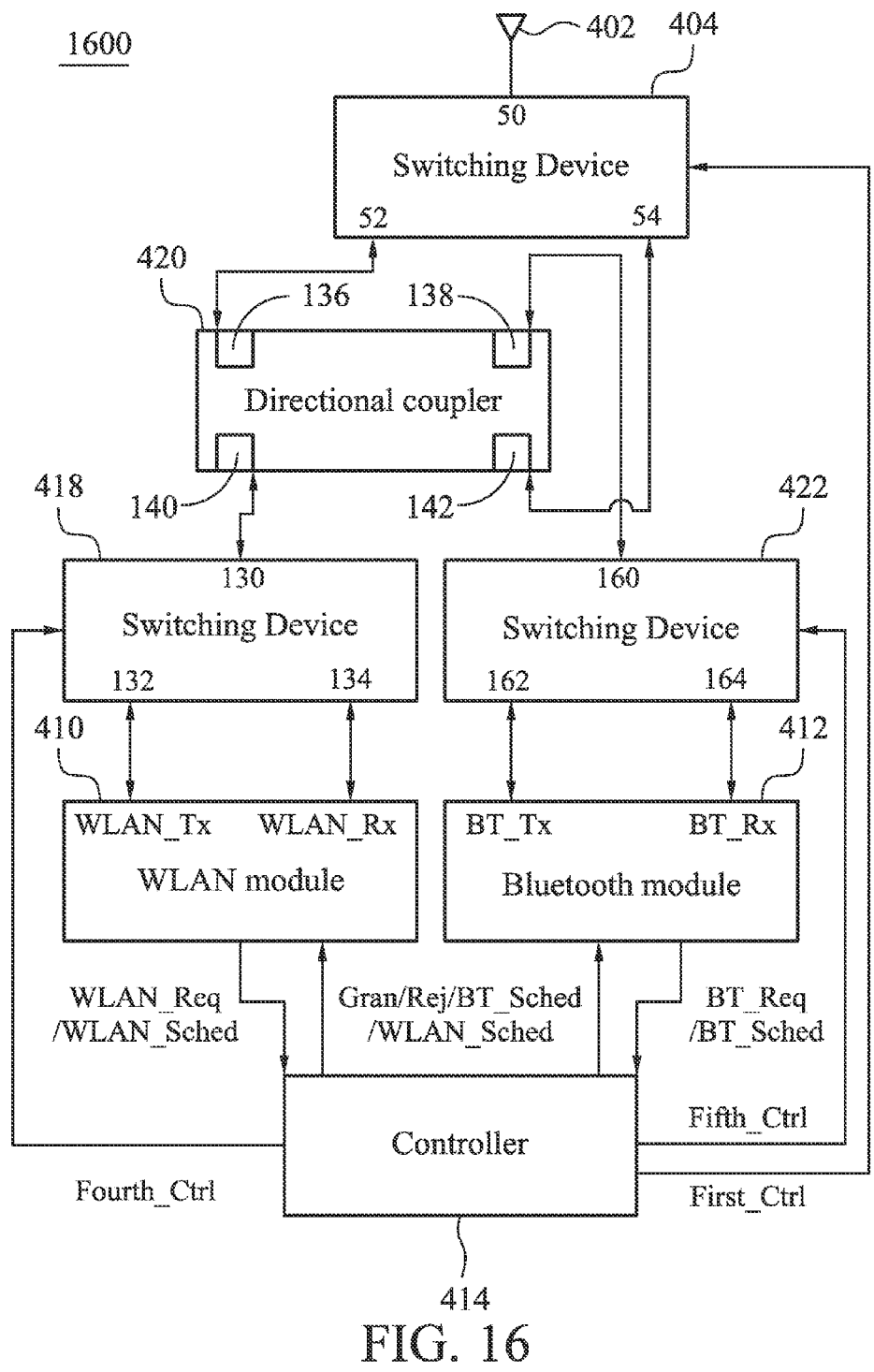
FIG. 16 shows another embodiment of a system for coexistence between a WLAN module and a BLUETOOTH module sharing a single antenna.
Figure 17A:
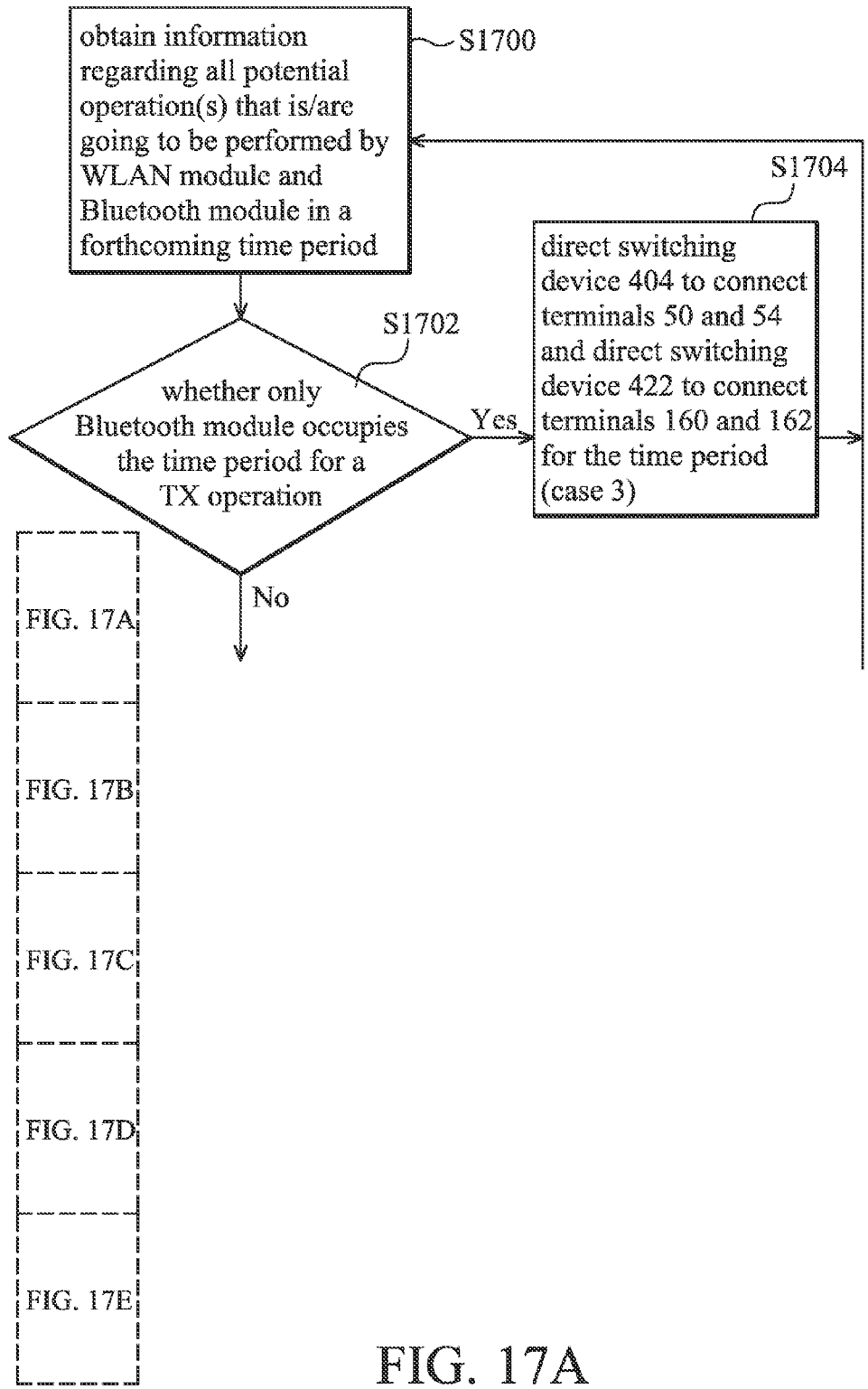
FIGS. 17A~17E show flowcharts for handling coexistence between WLAN and BLUETOOTH modules performed by the controller, according to another embodiment of the invention.
Figure 17B:
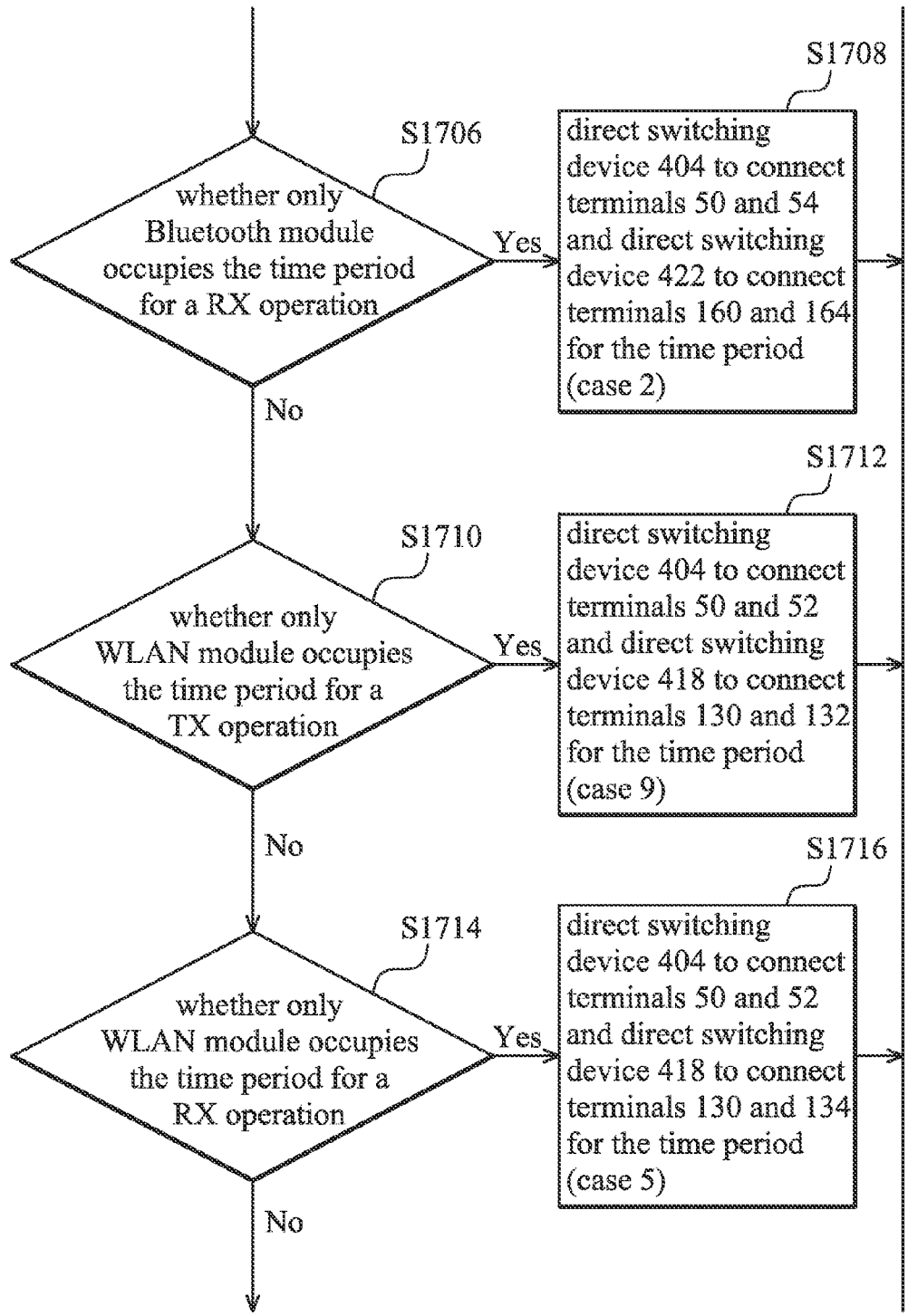
Figure 17C:
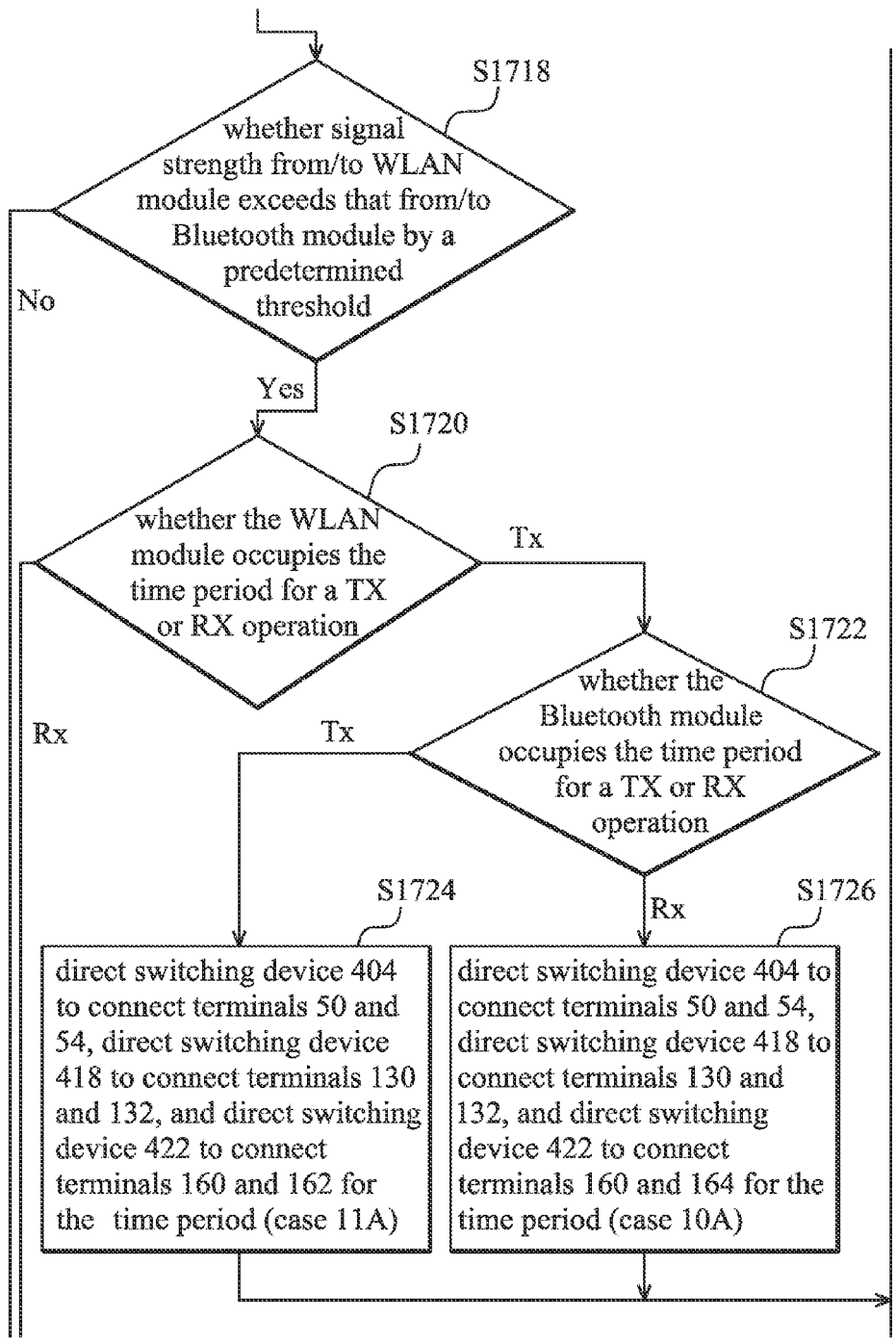
Figure 17D:
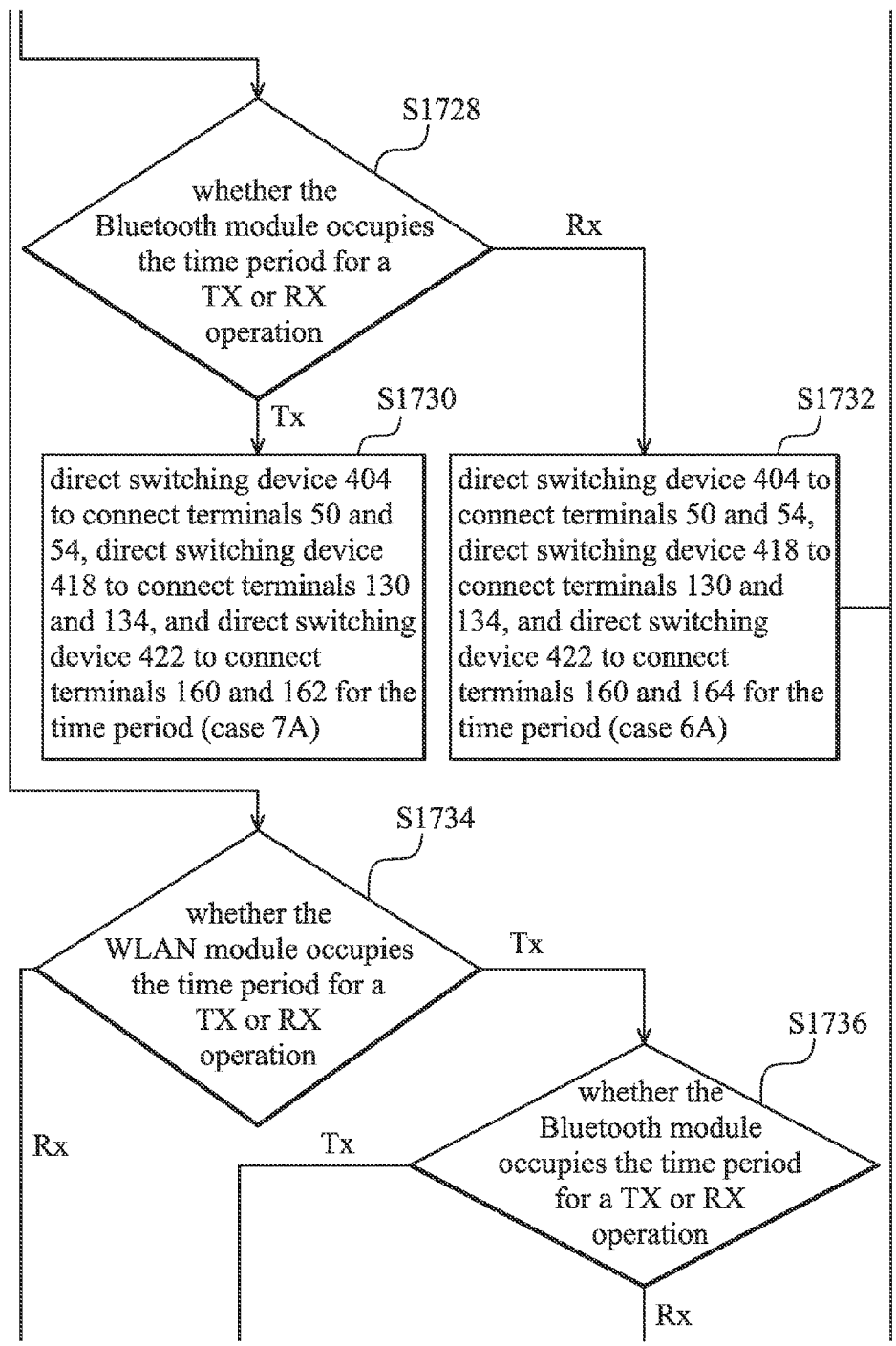
Figure 17E:
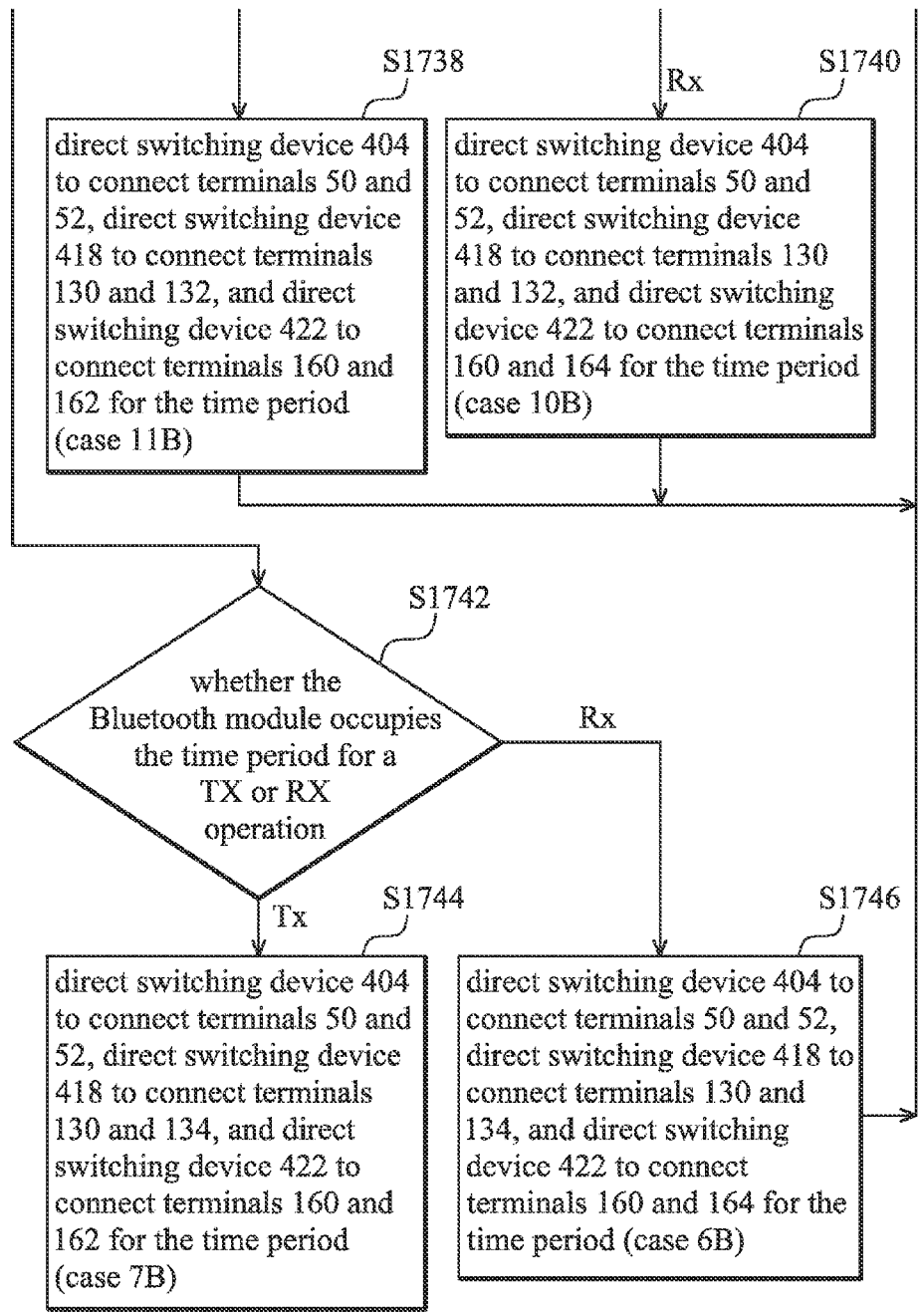

With the system 1300 of FIG. 13, those skilled in the art may readily modify the hardware architecture of FIG. 13 to that of FIG. 16 by separating the integrated port (labeled as BT_TRx of FIG. 13) into two ports (labeled as BT_Tx and BT_Rx of FIG. 16) and disposing a switching device 422 between the directional coupler 420 and the BLUETOOTH module 412 for connecting a terminal 160 to a terminal 162 or 164 depending on the BLUETOOTH operation type (e.g. a BLUETOOTH Tx or Rx operation). The switching device 422 may be implemented by an SPDT switch. The controller 414 then controls three switching devices 404, 418 and 422 by control signals (labeled as First_Ctrl, Fourth_Ctrl and Fifth_Ctrl) to enable the WLAN module 410 and BLUETOOTH module 412 to transmit or receive data via the shared antenna 402.

Table 4 shows a combination of potential operations performed by the WLAN module 410 and the BLUETOOTH module 412, according to the system 1600 shown of FIG. 16:

TABLE 4

| | Operation Type | | | | |
|---|---|---|---|---|---|
| Case Type | WLAN_Tx | WLAN_Rx | BT_Tx | BT_Rx | Signal Strength Attenuation For WLAN or BT |
| Case 1 | 0 | 0 | 0 | 0 | None |
| Case 2 | 0 | 0 | 0 | 1 | None |
| Case 3 | 0 | 0 | 1 | 0 | None |
| Case 4 | 0 | 0 | 1 | 1 | None |
| Case 5 | 0 | 1 | 0 | 0 | None |
| Case 6A | 0 | 1 | 0 | 1 | WLAN |
| Case 6B | | | | | BT |
| Case 7A | 0 | 1 | 1 | 0 | WLAN |
| Case 7B | | | | | BT |
| Case 8 | 0 | 1 | 1 | 1 | None |
| Case 9 | 1 | 0 | 0 | 0 | None |
| Case 10A | 1 | 0 | 0 | 1 | WLAN |
| Case 10B | | | | | BT |
| Case 11A | 1 | 0 | 1 | 0 | WLAN |
| Case 11B | | | | | BT |
| Case 12 | 1 | 0 | 1 | 1 | None |
| Case 13 | 1 | 1 | 0 | 0 | None |
| Case 14 | 1 | 1 | 0 | 1 | None |
| Case 15 | 1 | 1 | 1 | 0 | None |
| Case 16 | 1 | 1 | 1 | 1 | None |

In Table 4 above, the case 1 is not discussed, as no operation exists. The cases 13 to 16, where the WLAN module 410 performs Tx and Rx operations simultaneously, is not permitted in the system 1600 and therefore not discussed. Based on the same reason, the cases 4, 8 and 12, where the BLUETOOTH module 412 performs Tx and Rx operations simultaneously, are also not discussed. The other cases will be discussed with references made to the flowcharts in FIGS. 17A~17E.

According to the hardware architecture shown in FIG. 16, those skilled in the art may readily modify the control flow of FIGS. 15A~15C to that of FIGS. 17A~17E by incorporating similar but different inspections and controls with respect to the switching devices 404, 418 and 422. Details of the control flow in FIGS. 17A~17E can be obtained with references made to the descriptions with respect to FIGS. 11 and 13, and are therefore not described hereinafter for brevity.

The descriptions so far have been made for systems for the coexistence between WLAN and BLUETOOTH wireless communication services according to several embodiments of the invention. The conception of coexistence between wireless communication systems, however, may also apply to Worldwide Interoperability for Microwave Access (WiMAX) wireless communication service.

Figure 18:
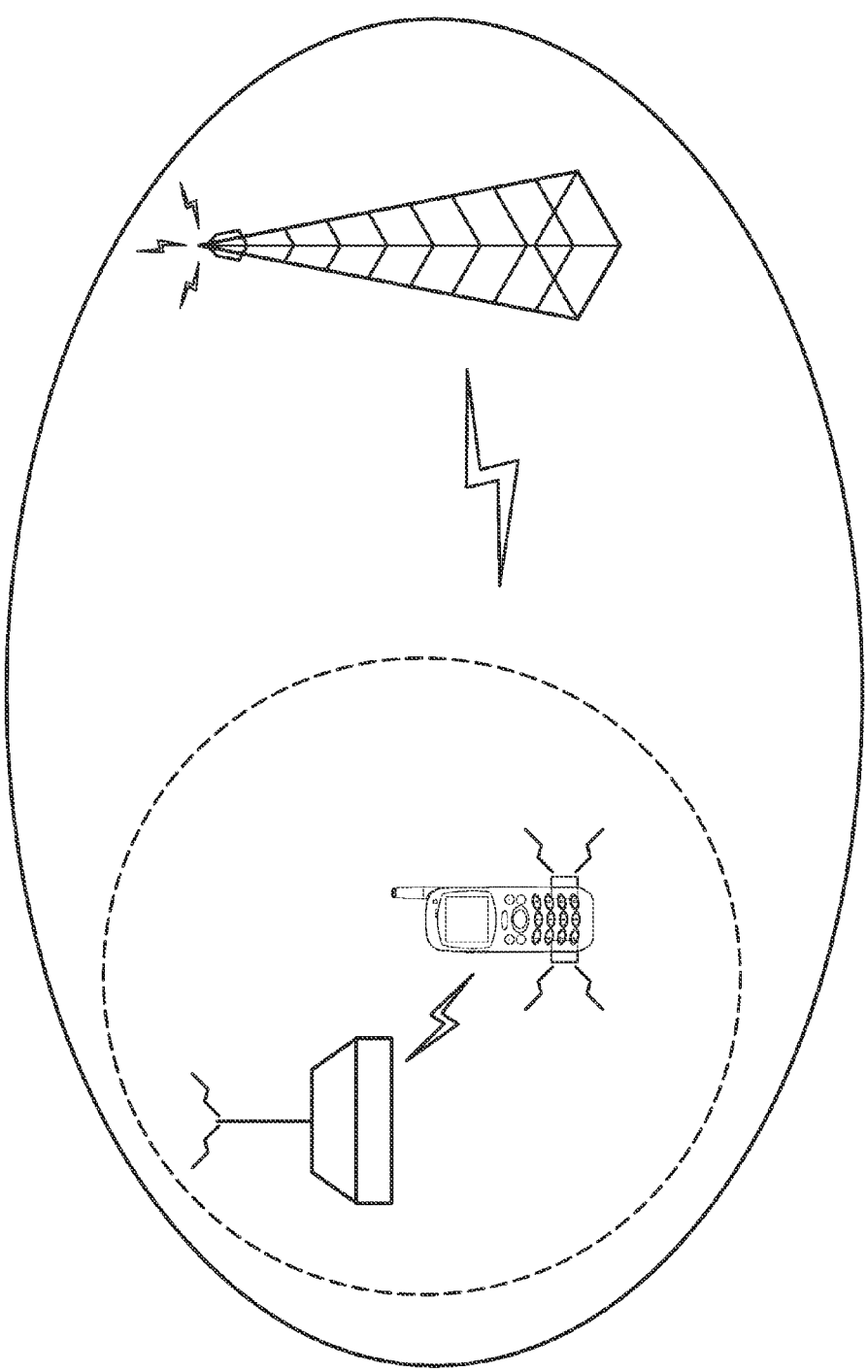
FIG. 18 shows a diagram of a cellular phone connecting to a WLAN via a WLAN module as well as camping on a WiMAX base station through a WiMAX module.

IEEE 802.16 (WiMAX) represents a standard for wireless broadband access, and is designed for outdoor, long-range and carrier-class applications with high throughput. Referring to FIG. 18, a cellular phone may associate a WLAN via a WLAN module and further camp on a WiMAX base station through a WiMAX module, where a WLAN access point is deployed inside an 802.16 cell. The 802.16 standard supports both licensed and license-exempt spectrums, where an 802.16a specifies an operation in the 2-10 GHz band, supporting raw bit rates of up to 75 Mb/s with variable channel bandwidths of 1.5 MHz to 20 MHz. The WiMAX module may use Orthogonal Frequency-Division Multiplexing (OFDM) mechanism with 20 MHz-wide bandwidth. New interference challenges as the new protocol operates is faced over several frequency bands (defined by 'profiles" in WiMAX terminology), with the most common being 2.2-2.4 GHz and 2.5-2.7 GHz. The frequency separation, although greater than that between BLUETOOTH and WiFi, is still not enough to prevent coexistence problems. Typically, the interference can be solved by separating WiMAX and WLAN transceiving operations into different time slots. That is, the single antenna can be occupied by only one of the WiMAX and WLAN modules within a time period for a transmission or a receiving operation (Tx or Rx). By using the time division mechanism, however, maintaining high quality speech or data transmission for a WiMAX wireless communication service would result in limited data throughput for a WLAN wireless communication service, and vice versa.

Figure 19:
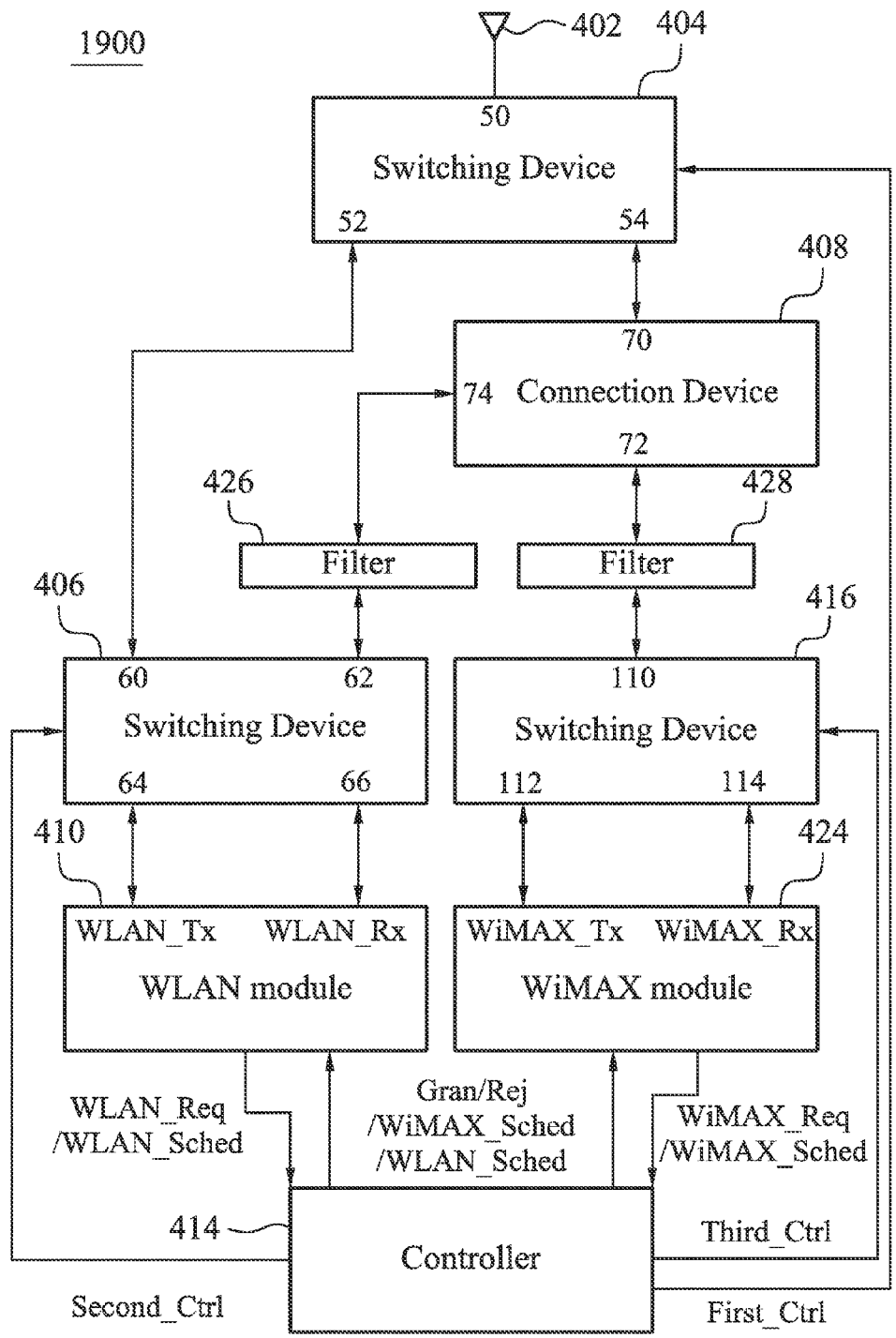
FIG. 19 shows a system for coexistence between a WLAN module and a WiMAX module sharing a single antenna according to an embodiment of the invention.

FIG. 19 shows a system for coexistence between a WLAN module and a WiMAX module sharing a single antenna according to an embodiment of the invention, which is modified according to the architecture of FIG. 11. The controller 414 may operate as a PTA controller or a traffic scheduler as mentioned above, and control the switching devices 404, 406 and 416 by control signals (labeled as First_Ctrl, Second_Ctrl and Third_Ctrl) to enable the WLAN module 410 and WiMAX module 424 to transmit or receive data via the shared antenna 402 based on the PTA or scheduled results. In addition, a filter 426 is coupled between terminals 74 and 62, and filters out unwanted frequencies, allowing only the WLAN frequency range (band of frequencies) to reach the output side. In general, the WALN frequency band is 2.4 to 2.5 GHz. The filter 426 may be a bandpass filter. A filter 428 is coupled between terminals 72 and 110, allowing all frequency bands other than the WLAN frequency band to reach the output side. The filter 428 may be a notch filter.

Without departing from the spirit of the invention, an embodiment of a method for handling coexistence between a WLAN module 410 and a WiMAX module 424 performed by the controller 414 can be devised with relevant modifications according to the architecture of FIG. 19 and the flowcharts of FIGS. 12A~12C.

Figure 20:
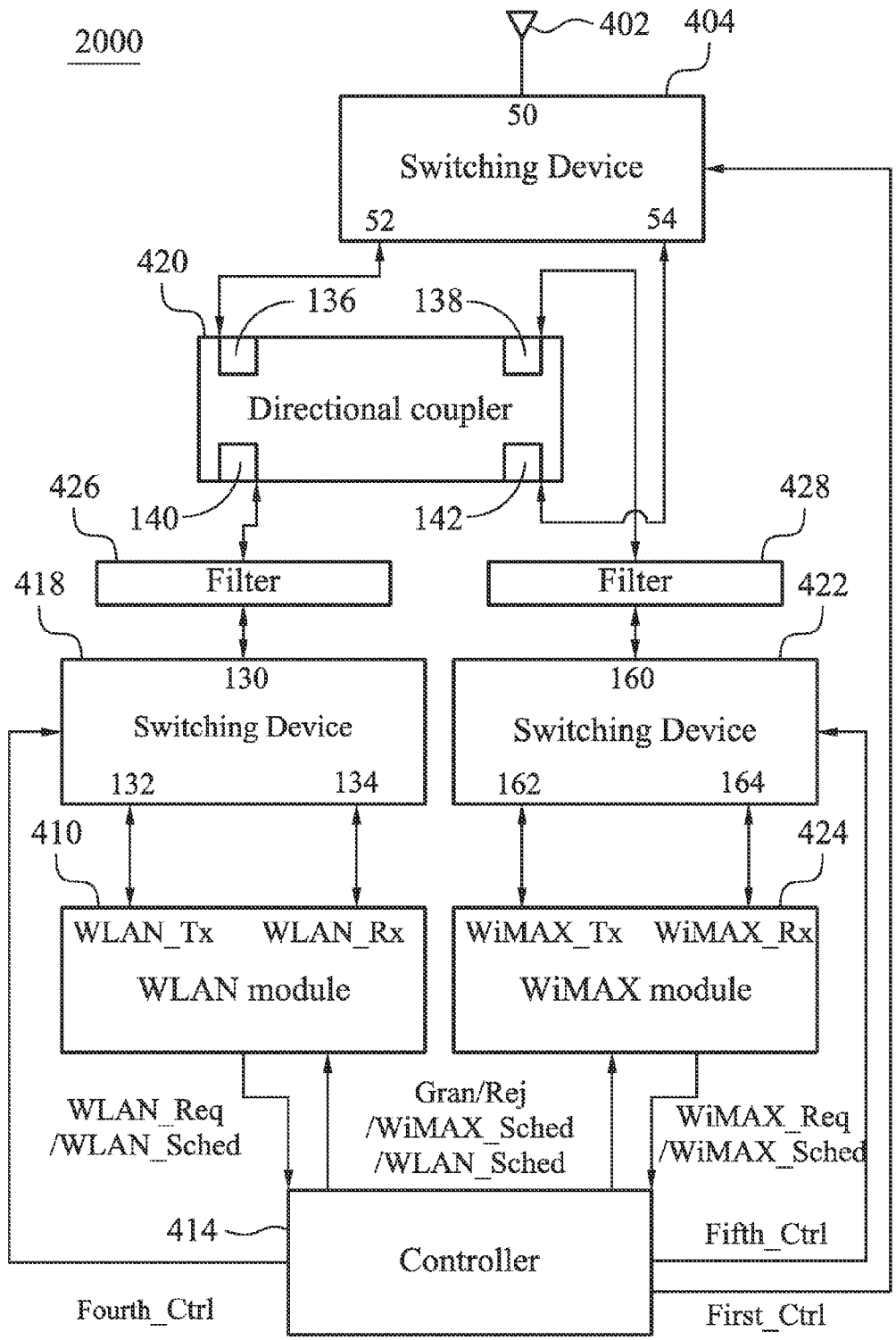
FIG. 20 shows a system for coexistence between a WLAN module and a WiMAX module sharing a single antenna according to another embodiment of the invention.

In addition, FIG. 20 shows another embodiment of a system for coexistence between a WLAN module and a WiMAX module sharing a single antenna, which is modified according to the architecture of FIG. 16. The controller 414 may operate as a PTA controller or a traffic scheduler as mentioned above, and control the switching devices 404, 418 and 422 by control signals (labeled as First_Ctrl, Fourth_Ctrl and Fifth_Ctrl) to enable the WLAN module 410 and WiMAX module 424 to transmit or receive data via the shared antenna 402 based on the PTA or scheduled results. In addition, the filter 426 is coupled between the port 140 of the directional coupler 420 and the terminal 130, and the filter 428 is coupled between the port 138 of the directional coupler 420 and the terminal 160.

Without departing from the spirit of the invention, an embodiment of a method for handling coexistence between a WLAN module and a WiMAX module performed by the controller can be devised with relevant modifications according to the architecture of FIG. 20 and the control flow of FIGS. 17A~17E.

Similarly, when a WiMAX transmission occurs on a frequency that falls within the frequency space occupied by an ongoing BLUETOOTH transmission, a certain level of interference may occur, depending on the signal strength thereof. Because both the BLUETOOTH module 412 and WiMAX module 424 share the same spectrum and share a single antenna, avoiding interference therebetween is required. Typically, the interference can be solved by separating WiMAX and BLUETOOTH transceiving operations into different time slots. That is, the single antenna can be occupied by only one of the WiMAX and BLUETOOTH modules within a time period for a transmission or a receiving operation. By using the time division mechanism, however, maintaining high quality speech or data transmission for a PAN would result in limited data throughput for a WiMAX wireless communication service, and vice versa.

Figure 21:
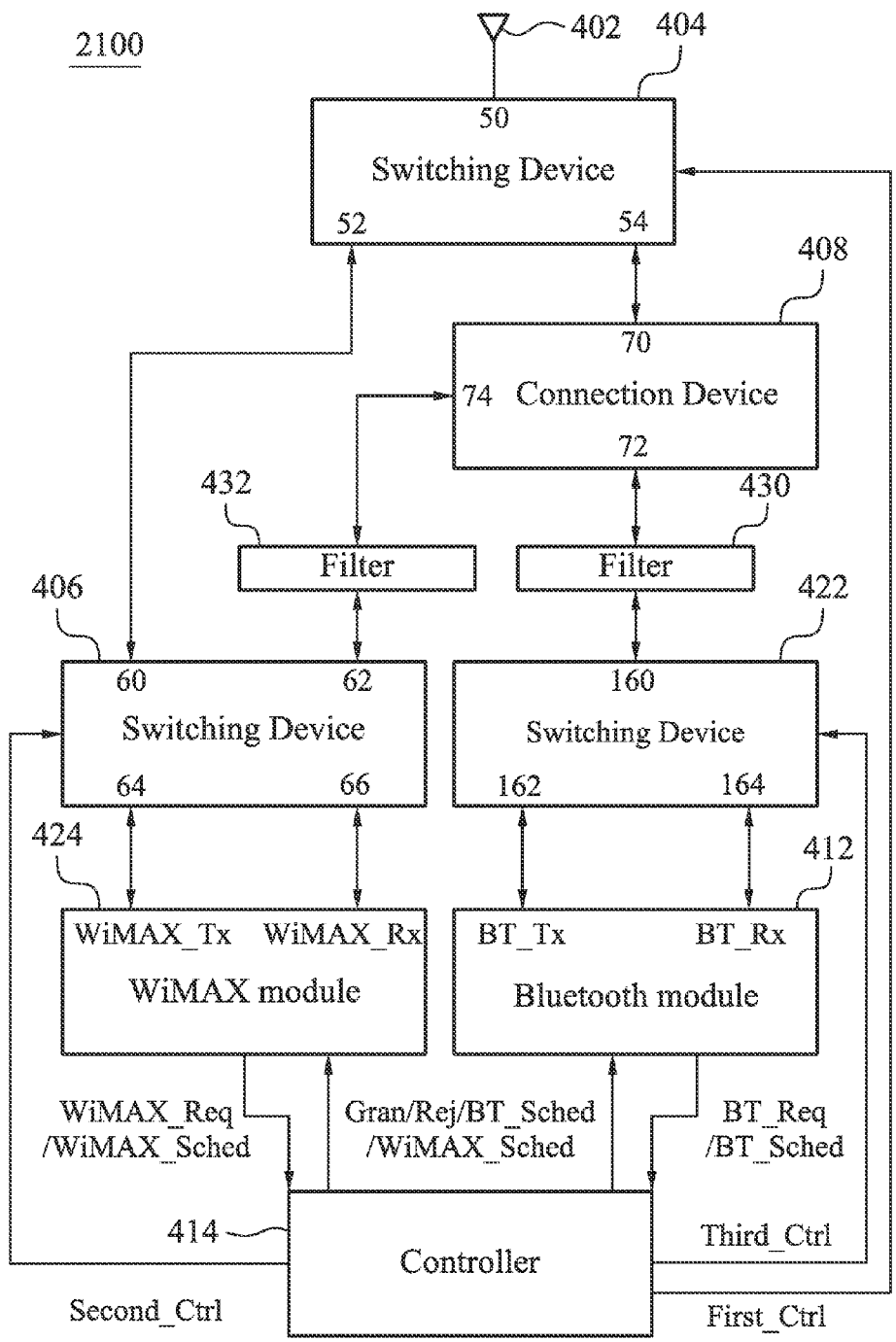
FIG. 21 shows a system for coexistence between a BLUETOOTH module and a WiMAX module sharing a single antenna according to another embodiment of the invention.

FIG. 21 shows another embodiment of a system for coexistence between a BLUETOOTH module and a WiMAX module sharing a single antenna, which is modified according to the architecture of FIG. 11. The controller 414 may operate as a PTA controller or a traffic scheduler as mentioned above, and control the switching devices 404, 406 and 422 by control signals (labeled as First_Ctrl, Second_Ctrl and Third_Ctrl) to enable the BLUETOOTH module 412 and WiMAX module 424 to transmit or receive data via the shared antenna 402 based on the PTA or scheduled results. In addition, a filter 430 is coupled between terminals 72 and 160, and filters out unwanted frequencies, allowing only the BLUETOOTH frequency range (band of frequencies) to reach the output side. Similar to the WALN frequency band, the BLUETOOTH frequency band is 2.4 to 2.5 GHz. The filter 430 may be a bandpass filter. A filter 432 is coupled between terminals 74 and 62, allowing all frequency bands other than the BLUETOOTH frequency band to reach the output side. The filter 432 may be a notch filter.

Without departing from the spirit of the invention, an embodiment of a method for handling coexistence between BLUETOOTH module 412 and WiMAX module 424 performed by the controller 414 can be devised with relevant modifications according to the architecture of FIG. 21 and the control flow of FIGS. 12A~12C.

Figure 22:
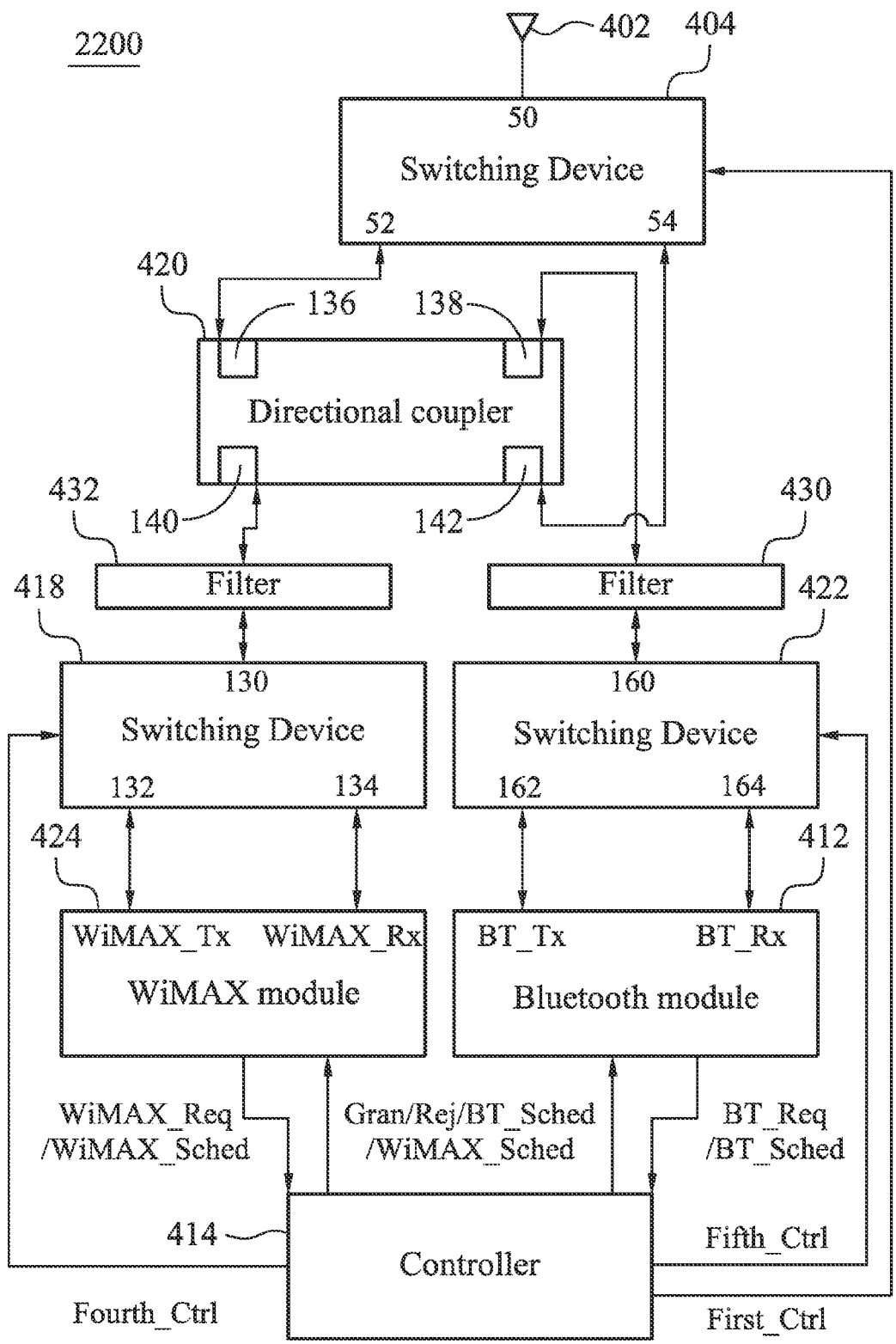
FIG. 22 shows a system for coexistence between a BLUETOOTH module and a WiMAX module sharing a single antenna according to another embodiment of then invention.

FIG. 22 shows another embodiment of a system for coexistence between a BLUETOOTH module and a WiMAX module sharing a single antenna, which is modified according to the architecture of FIG. 16. The controller 414 may operate as a PTA controller or a traffic scheduler as mentioned above, and control the switching devices 404, 416 and 422 by control signals (labeled as First_Ctrl, Fourth_Ctrl and Fifth_Ctrl) to enable the BLUETOOTH module 412 and WiMAX module 424 to transmit or receive data via the shared antenna 402 based on the PTA or scheduled results. In addition, the filter 432 is coupled between the port 140 of the directional coupler 420 and the terminal 130, and the filter 430 is coupled between the port 138 of the directional coupler 420 and the terminal 160.

Without departing from the spirit of the invention, an embodiment of a method for handling coexistence between BLUETOOTH module 412 and WiMAX module 424 performed by the controller can be devised with relevant modifications according to the architecture of FIG. 22 and the control flow of FIGS. 17A~17E.

In addition, the conception of coexistence between wireless communication systems may also apply to long term evolution (LTE) wireless communication service.

Referring to FIG. 18, a cellular phone may also associate a WLAN via a WLAN module and further camp on a LTE base station through a LTE module, where a WLAN access point is deployed inside a cell. In this embodiment, the WLAN module is based on the IEEE 802.11ah, IEEE 802.11af standards, and so on.

Figure 24:
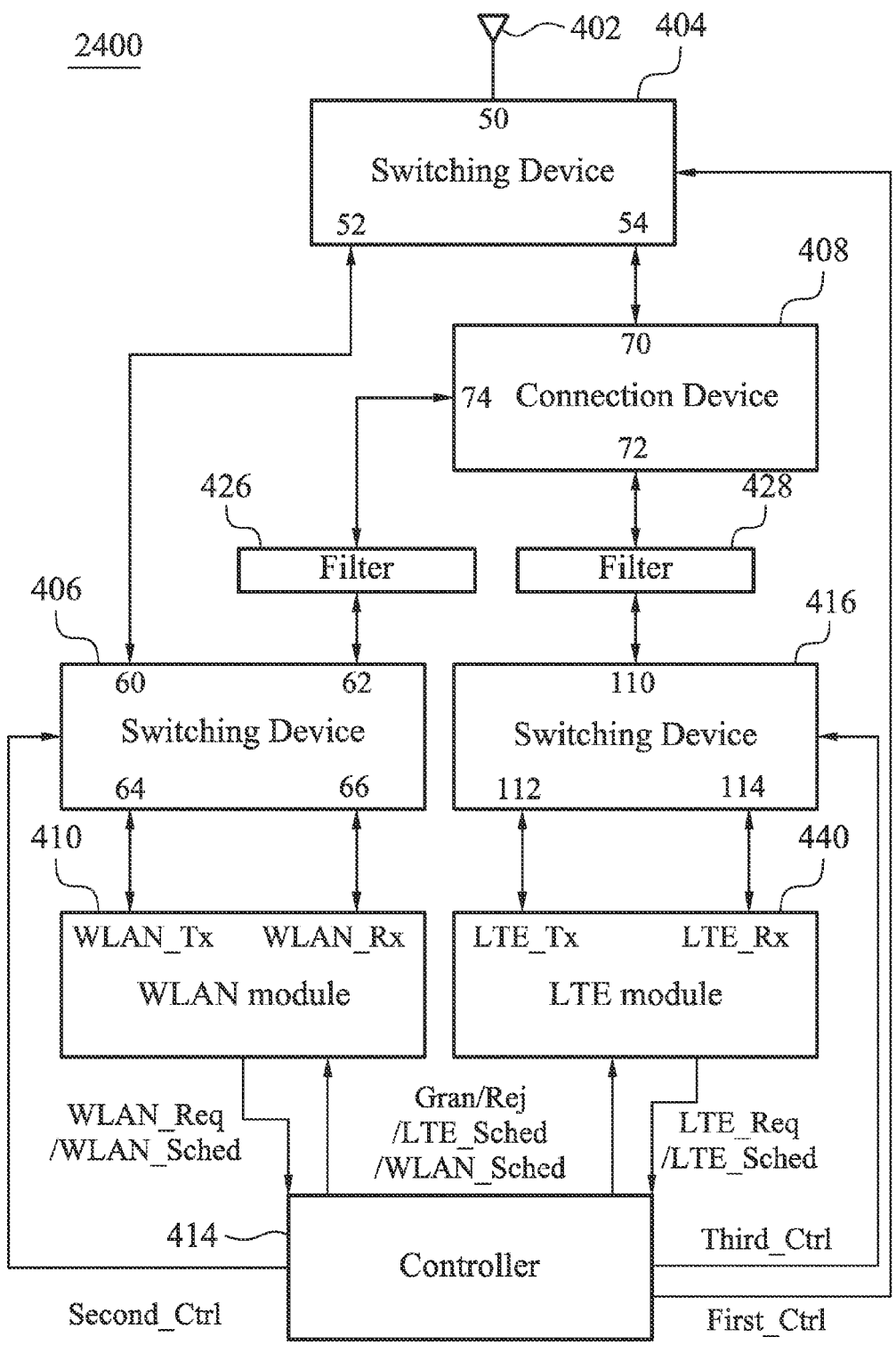
FIG. 24 shows a system for coexistence between a WLAN module and a LTE module sharing a single antenna according to an embodiment of the invention.

FIG. 24 shows a system for coexistence between a WLAN module and a LTE module sharing a single antenna according to an embodiment of the invention, which is modified according to the architecture of FIG. 11. The controller 414 may operate as a PTA controller or a traffic scheduler as mentioned above, and control the switching devices 404, 406 and 416 by control signals (labeled as First_Ctrl, Second_Ctrl and Third_Ctrl) to enable the WLAN module 410 and LTE module 440 to transmit and receive data via the shared antenna 402 based on the PTA or scheduled results. In addition, a filter 426 is coupled between terminals 74 and 62, and filters out unwanted frequencies, allowing only the WLAN frequency range (band of frequencies) to reach the output side. In general, the WALN frequency band is 2.4 to 2.5 GHz. The filter 426 may be a bandpass filter. A filter 428 is coupled between terminals 72 and 110, allowing all frequency bands other than the WLAN frequency band to reach the output side. The filter 428 may be a notch filter.

Without departing from the spirit of the invention, an embodiment of a method for handling coexistence between a WLAN module 410 and a LTE module 440 performed by the controller 414 can be devised with relevant modifications according to the architecture of FIG. 24 and the flowchart of FIGS. 12A~12C.

Figure 25:
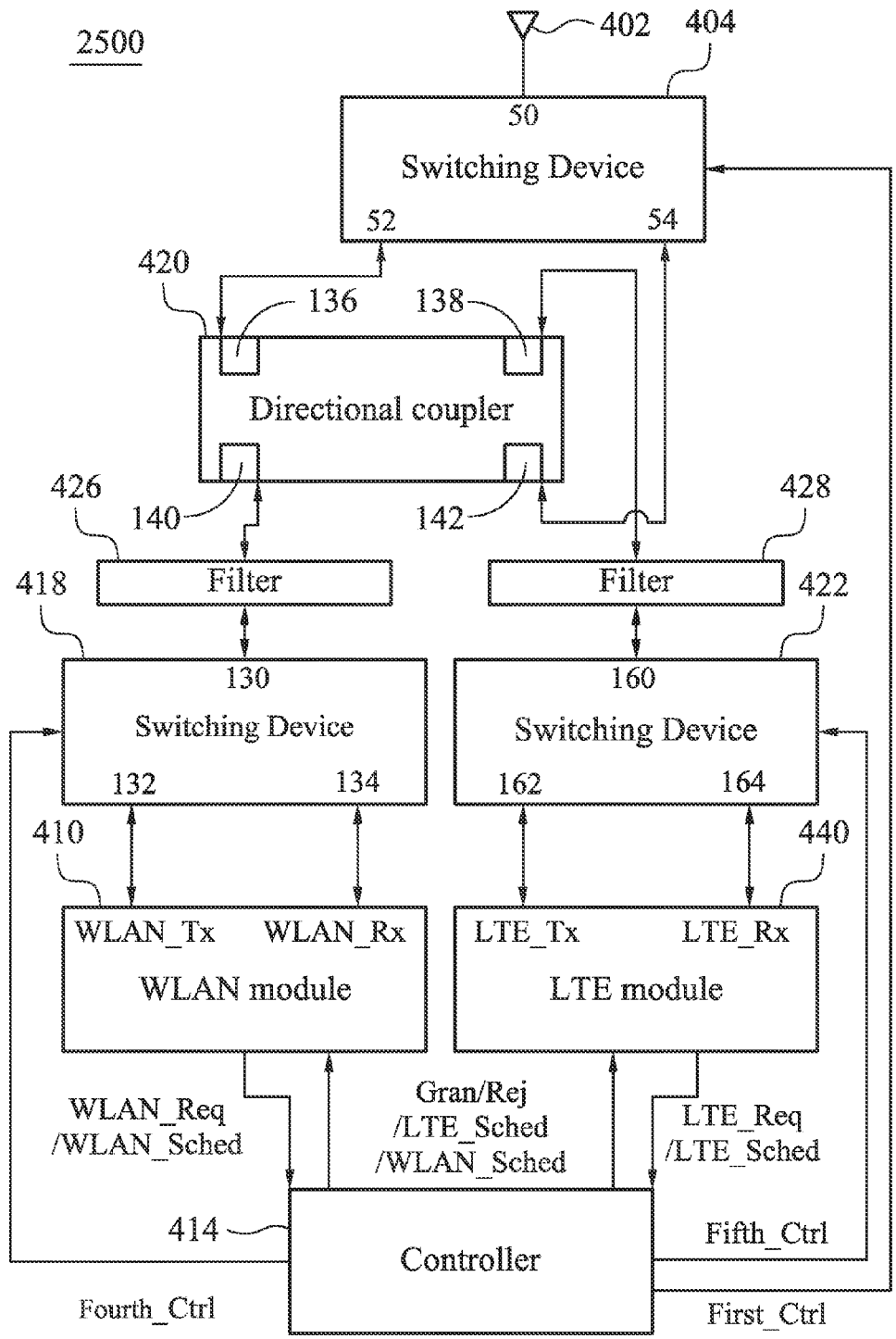
FIG. 25 shows a system for coexistence between a WLAN module and a LTE module sharing a single antenna according to another embodiment of the invention.

In addition, FIG. 25 shows another embodiment of a system for coexistence between a WLAN module and a LTE module sharing a single antenna, which is modified according to the architecture of FIG. 16. The controller 414 may operate as a PTA controller or a traffic scheduler as mentioned above, and control the switching devices 404, 418 and 422 by control signals (labeled as First_Ctrl, Fourth_Ctrl and Fifth_Ctrl) to enable the WLAN module 410 and LTE module 440 to transmit and receive data via the shared antenna 402 based on the PTA or scheduled results. In addition, the filter 426 is coupled between the port 140 of the directional coupler 420 and the terminal 130, and the filter 428 is coupled between the port 138 of the directional coupler 420 and the terminal 160.

Without departing from the spirit of the invention, an embodiment of a method for handling coexistence between a WLAN module and a LTE module performed by the controller can be devised with relevant modifications according to the architecture of FIG. 25 and the control flow of FIGS. 17A~17E.

Figure 23:
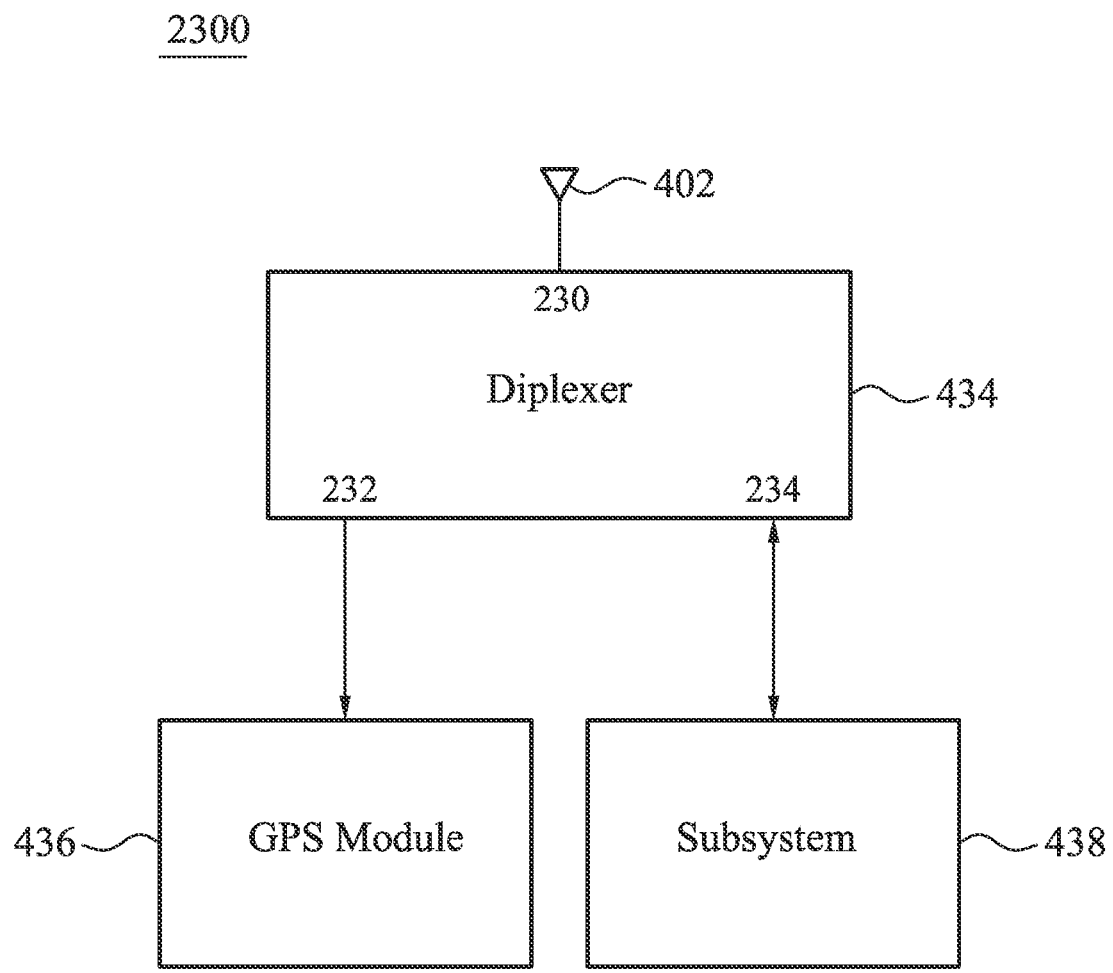
FIG. 23 shows a system for coexistence between a Global Positioning System (GPS) and a subsystem sharing a single antenna according to an embodiment of the invention.

FIG. 23 shows another embodiment of a system for coexistence between a Global Positioning System (GPS) and a subsystem sharing a single antenna, with the subsystem being any one of the systems 400, 1100, 1300, 1600, 1900, 2000, 2100, 2200, 2400 and 2500 excluding the antenna 402. The system 2300 comprises an antenna 402, a diplexer 434, a GPS module and a subsystem 438. The diplexer 434 is configured to connect a terminal 230 to both terminals 232 and 234 such that the GPS signals (Tx or Rx signal) are transmitted to/received from the shared antenna 402 via the diplexer 434, and the wireless signals of the subsystem 438 (Tx or Rx signal) are simultaneously transmitted to/received from the shared antenna 402 via the diplexer 434.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for the coexistence between a plurality of wireless communication modules sharing a single antenna, comprising:
   a first transceiving path coupled to an antenna;
   a second transceiving path coupled to the first transceiving path;
   a first wireless communications module coupled to the first transceiving path and transmitting or receiving a plurality of first wireless signals via the first transceiving path;
   a second wireless communications module coupled to the second transceiving path and capable of transmitting and receiving a plurality of second wireless signals via the first and the second transceiving paths; and
   a directional coupler that attenuates signal strengths of the second wireless signals passing through the second transceiving path, and adds the attenuated second wireless signals to the first wireless signals passing through the first transceiving path,
   wherein one of the first wireless communications module and the second communications module is a LTE module and the other one of the first wireless communications module and the second communications module is a WLAN module.

2. The system as claimed in claim 1, wherein the WLAN module is based on IEEE 802.11ah or IEEE 802.11af.

3. The system as claimed in claim 1, wherein the directional coupler comprises:
   a first port coupled to the single antenna;
   a second port coupled to the first wireless communications module; and
   a third port coupled to the second wireless communications module.

4. A system for the coexistence between a plurality of wireless communication modules sharing a single antenna, comprising:
   a first transceiving path coupled to an antenna;
   a second transceiving path coupled to the first transceiving path;
   a first wireless communications module coupled to the first transceiving path and transmitting or receiving a plurality of first wireless signals via the first transceiving path;
   a second wireless communications module coupled to the second transceiving path and capable of transmitting and receiving a plurality of second wireless signals via the first and the second transceiving paths; and
   a directional coupler that attenuates signal strengths of the second wireless signals passing through the second transceiving path, and adds the attenuated second wireless signals to the first wireless signals passing through the first transceiving path.

5. The system as claimed in claim 4, wherein the directional coupler comprises:
   a first port coupled to the single antenna;
   a second port coupled to the first wireless communications module; and
   a third port coupled to the second wireless communications module.

* * * * *